(12) United States Patent
Platt et al.

(10) Patent No.: US 12,492,292 B2
(45) Date of Patent: *Dec. 9, 2025

(54) APERTURED POLYMER SHEETS INCORPORATING NANOPARTICLES

(71) Applicants: DelStar Technologies, Inc., Middletown, DE (US); LMS Technologies, Inc., Bloomington, MN (US)

(72) Inventors: Andrew G. Platt, Middletown, DE (US); Lenny Pompeo, Middletown, DE (US)

(73) Assignees: DelStar Technologies, Inc., Alpharetta, GA (US); LMS Technologies, Inc., Bloomington, MN (US)

( * ) Notice: Subject to any disclaimer, the term of this patent is extended or adjusted under 35 U.S.C. 154(b) by 287 days.

This patent is subject to a terminal disclaimer.

(21) Appl. No.: 18/297,187

(22) Filed: Apr. 7, 2023

(65) Prior Publication Data

US 2023/0323062 A1    Oct. 12, 2023

Related U.S. Application Data

(60) Provisional application No. 63/328,959, filed on Apr. 8, 2022.

(51) Int. Cl.
*B01D 69/02* (2006.01)
*B01D 39/16* (2006.01)
(Continued)

(52) U.S. Cl.
CPC ............... *C08J 9/008* (2013.01); *B29C 48/08* (2019.02); *C08J 9/0085* (2013.01);
(Continued)

(58) Field of Classification Search
CPC ...... C08J 9/008; C08J 9/0085; C08J 2323/06; B29C 48/08; F01N 3/0226;
(Continued)

(56) References Cited

U.S. PATENT DOCUMENTS

| | | |
|---|---|---|
| 3,963,392 A | 6/1976 | Goyal |
| 4,406,950 A | 9/1983 | Roesel, Jr. |

(Continued)

FOREIGN PATENT DOCUMENTS

| | | |
|---|---|---|
| CN | 108004628 B | 4/2021 |
| EP | 2419203 B1 | 8/2020 |

(Continued)

OTHER PUBLICATIONS

Machine-generated English translation of JP 2017-080704 A, published May 18, 2017.*

(Continued)

*Primary Examiner* — Frank M Lawrence, Jr.
(74) *Attorney, Agent, or Firm* — Farber LLC

(57) ABSTRACT

Apertured polymeric layers, sheets, mesh or films are provided for a variety of different applications. A polymeric sheet comprises at least one polymer layer having one or more apertures for flow of gas or liquid therethrough, and a plurality of nanoparticles disposed within the polymer sheet such that the nanoparticles are disposed between a first surface of the polymer sheet and a second surface opposite the first surface. The nanoparticles filter contaminants passing through the polymeric sheet. The apertured sheets may comprise filter media and/or support membranes for filter media in gas or liquid filters. The nanoparticles reduce the overall pressure drop across the support membranes to improve the efficiency of such filters.

17 Claims, 20 Drawing Sheets

(51) Int. Cl.
*B29C 48/08* (2019.01)
*C08J 9/00* (2006.01)
*F01N 3/022* (2006.01)
*B29K 23/00* (2006.01)
*B29K 67/00* (2006.01)

(52) U.S. Cl.
CPC ........ *F01N 3/0226* (2013.01); *B29K 2023/06* (2013.01); *B29K 2023/12* (2013.01); *B29K 2067/046* (2013.01); *C08J 2323/06* (2013.01)

(58) Field of Classification Search
CPC ............ B29K 2023/06; B29K 2023/12; B29K 2067/046; B01D 39/1623; B01D 2239/0233; B01D 2239/025; B01D 2239/0258; B01D 2239/0435; B01D 2239/0622; B01D 2239/0627; B01D 2239/0654; B01D 2239/08; B01D 2239/10; B01D 2239/1225; B01D 2239/1233; B01D 2239/1291; B01D 39/2017; B01D 39/2065; B01D 2239/0407
USPC .................. 55/522, 524, 527, 528; 96/4, 11
See application file for complete search history.

(56) References Cited

U.S. PATENT DOCUMENTS

| | | |
|---|---|---|
| 4,532,169 A | 7/1985 | Carley |
| 5,401,693 A | 3/1995 | Bauer et al. |
| 5,656,368 A | 8/1997 | Braun et al. |
| 5,972,808 A | 10/1999 | Groeger et al. |
| 6,169,045 B1 | 1/2001 | Pike et al. |
| 6,338,814 B1 | 1/2002 | Hills |
| 6,520,426 B2 | 2/2003 | Huffman |
| 6,616,435 B2 | 9/2003 | Lee et al. |
| 6,743,273 B2 | 6/2004 | Chung et al. |
| 6,861,142 B1 | 3/2005 | Wilkie et al. |
| 6,972,104 B2 | 12/2005 | Haynes et al. |
| 7,252,493 B1 | 8/2007 | Johnston et al. |
| 7,300,272 B1 | 11/2007 | Haggard |
| 7,309,430 B2 | 12/2007 | Hills |
| 7,390,760 B1 | 6/2008 | Chen et al. |
| 7,422,071 B2 | 9/2008 | Wilkie et al. |
| 7,432,869 B2 | 10/2008 | Haggard et al. |
| 7,504,348 B1 | 3/2009 | Hagewood et al. |
| 7,772,456 B2 | 8/2010 | Zhang et al. |
| 7,774,077 B1 | 8/2010 | Ford |
| 8,017,534 B2 | 9/2011 | Harvey et al. |
| 9,293,750 B2 | 3/2016 | Yang et al. |
| 9,457,322 B2 | 10/2016 | Choi et al. |
| 9,522,357 B2 | 12/2016 | Kwok et al. |
| 9,993,761 B2 | 6/2018 | Kwok et al. |
| 10,179,842 B2 | 1/2019 | Gjoka et al. |
| 10,201,836 B2 | 2/2019 | Jikahara et al. |
| 10,252,201 B2 | 4/2019 | Kamiyama |
| 10,799,820 B2 | 10/2020 | Smithies |
| 11,376,534 B2 | 7/2022 | Yung et al. |
| 11,491,423 B2 | 11/2022 | Hacker |
| 2002/0139746 A1 | 10/2002 | Koslow |
| 2002/0144942 A1 | 10/2002 | Denton et al. |
| 2003/0047076 A1 | 3/2003 | Liu |
| 2003/0186405 A1 | 10/2003 | Lee et al. |
| 2006/0079145 A1 | 4/2006 | Cox |
| 2006/0089072 A1 | 4/2006 | Baker, Jr. et al. |
| 2006/0264140 A1 | 11/2006 | Andrady et al. |
| 2007/0021021 A1 | 1/2007 | Verdegan et al. |
| 2007/0056256 A1 | 3/2007 | Tepper et al. |
| 2007/0123130 A1 | 5/2007 | Manuel et al. |
| 2007/0175196 A1 | 8/2007 | Tepper et al. |
| 2007/0190880 A1 | 8/2007 | Dubrow et al. |
| 2008/0160856 A1 | 7/2008 | Chen et al. |
| 2008/0213561 A1 | 9/2008 | Krins et al. |
| 2008/0217239 A1 | 9/2008 | Chen et al. |
| 2008/0264259 A1 | 10/2008 | Leung |
| 2009/0065436 A1 | 3/2009 | Kalayci et al. |
| 2009/0094954 A1 | 4/2009 | Nakayama et al. |
| 2009/0165223 A1 | 7/2009 | Braunecker et al. |
| 2009/0266759 A1 | 10/2009 | Green |
| 2010/0101413 A1* | 4/2010 | Jones ..................... B01J 20/024 |
| | | 96/108 |
| 2010/0187171 A1 | 7/2010 | Gupta |
| 2010/0252486 A1 | 10/2010 | Sato |
| 2010/0275780 A1 | 11/2010 | Bailey et al. |
| 2010/0296966 A1 | 11/2010 | Bae et al. |
| 2010/0300054 A1 | 12/2010 | Cole et al. |
| 2011/0210060 A1 | 9/2011 | Green et al. |
| 2011/0252970 A1 | 10/2011 | Jones et al. |
| 2012/0091223 A1 | 4/2012 | Yi et al. |
| 2012/0152821 A1 | 6/2012 | Cox et al. |
| 2012/0193282 A1* | 8/2012 | Wolf ................... B01J 20/28028 |
| | | 210/502.1 |
| 2012/0309246 A1 | 12/2012 | Tseitlin et al. |
| 2013/0030340 A1 | 1/2013 | Vincent et al. |
| 2014/0141336 A1 | 5/2014 | Morin |
| 2014/0203121 A1 | 7/2014 | Latta et al. |
| 2014/0255672 A1 | 9/2014 | Westwood |
| 2014/0260990 A1 | 9/2014 | Kwok et al. |
| 2014/0262088 A1 | 9/2014 | Deka |
| 2014/0295090 A1 | 10/2014 | Tseitlin et al. |
| 2015/0064433 A1 | 3/2015 | Foster et al. |
| 2016/0015098 A1 | 1/2016 | Conlon |
| 2016/0214085 A1 | 7/2016 | Hingorani et al. |
| 2016/0220927 A1 | 8/2016 | Kwok et al. |
| 2016/0229969 A1* | 8/2016 | Wiesner ............... B01D 71/281 |
| 2016/0256806 A1 | 9/2016 | Sanders et al. |
| 2016/0303592 A1 | 10/2016 | Rice et al. |
| 2017/0065923 A1 | 3/2017 | Fox et al. |
| 2017/0341004 A1 | 11/2017 | Miller et al. |
| 2017/0349719 A1 | 12/2017 | Sumnicht et al. |
| 2018/0070529 A1 | 3/2018 | Eastin et al. |
| 2018/0178149 A1 | 6/2018 | Longo et al. |
| 2018/0264386 A1 | 9/2018 | Drolet et al. |
| 2019/0002283 A1 | 1/2019 | Zhang et al. |
| 2019/0048500 A1 | 2/2019 | Tierney et al. |
| 2019/0209962 A1* | 7/2019 | Meirav ..................... B01D 24/10 |
| 2019/0218099 A1 | 7/2019 | Huynh |
| 2020/0030731 A1 | 1/2020 | Dhau et al. |
| 2020/0032438 A1 | 1/2020 | Chapman |
| 2020/0054975 A1 | 2/2020 | Belmont et al. |
| 2020/0102676 A1 | 4/2020 | Carlyle et al. |
| 2020/0122068 A1 | 4/2020 | Chung et al. |
| 2020/0129972 A1 | 4/2020 | Ozaki et al. |
| 2020/0179848 A1 | 6/2020 | Higginson et al. |
| 2020/0216979 A1 | 7/2020 | Pourdeyhimi et al. |
| 2020/0247675 A1 | 8/2020 | Schulz et al. |
| 2020/0270787 A1 | 8/2020 | Pourdeyhimi |
| 2021/0023813 A1 | 1/2021 | Tsotsis et al. |
| 2021/0070976 A1 | 3/2021 | Fritze et al. |
| 2021/0095419 A1 | 4/2021 | Dombrow, Jr. |
| 2021/0121804 A1 | 4/2021 | Smithies et al. |
| 2021/0324244 A1 | 10/2021 | Bieber et al. |
| 2021/0387123 A1 | 12/2021 | Inoue et al. |
| 2022/0088536 A1 | 3/2022 | Dhau et al. |
| 2022/0274040 A1 | 9/2022 | Chen et al. |
| 2022/0362696 A1 | 11/2022 | Cho et al. |
| 2023/0089270 A1 | 3/2023 | Nag |
| 2023/0090532 A1 | 3/2023 | Zinn et al. |
| 2023/0321568 A1* | 10/2023 | Platt ..................... B01D 39/083 |
| 2023/0321569 A1* | 10/2023 | Platt ..................... B01D 46/12 |
| 2023/0321571 A1* | 10/2023 | Platt ..................... B32B 5/269 |
| | | 55/488 |
| 2023/0321575 A1* | 10/2023 | Platt ..................... B32B 5/267 |
| 2023/0330585 A1 | 10/2023 | Ramamoorthy et al. |
| 2024/0091689 A1* | 3/2024 | Bland .................. B01D 71/024 |
| 2024/0100455 A1 | 3/2024 | Platt et al. |
| 2025/0041807 A1* | 2/2025 | Platt ..................... B01D 71/48 |

FOREIGN PATENT DOCUMENTS

| | | |
|---|---|---|
| JP | 2017080704 A * | 5/2017 |
| WO | 2004098753 A2 | 11/2004 |
| WO | 2007/109304 A2 | 9/2007 |

(56) References Cited

FOREIGN PATENT DOCUMENTS

| WO | 2008077372 A2 | 7/2008 |
|---|---|---|
| WO | 2010006784 A1 | 1/2010 |
| WO | 2021/011217 A1 | 1/2021 |
| WO | 2021158726 A1 | 8/2021 |
| WO | 2021/184111 A1 | 9/2021 |
| WO | 2021/203068 A1 | 10/2021 |
| WO | 2022/011689 A1 | 1/2022 |

OTHER PUBLICATIONS

International Search Report and Written Opinion; International Application No. PCT/US2024/040121; Nov. 27, 2024.
Liu et al., "Study on Stabilized of Poly (Vinyl Alcohol) Nanofibers Based Sandwich Structure Purification Material"; Advanced Materials research, vol. 535-537 (Jun. 2012), p. 473-476 (the entire document, and more specifically: p. 476, para 2; figures 6a-6b; abstract; title).
International Search Report and Written Opinion; International Application No. PCT/US2023/017937; Aug. 15, 2023.
International Search Report and Written Opinion; International Application No. PCT/US2023/017953; Aug. 15, 2023.
International Search Report and Written Opinion; International Application No. PCT/US2023/017955; Aug. 15, 2023.
International Search Report and Written Opinion; International Application No. PCT/US2023/017921; Aug. 25, 2023.
International Search Report and Written Opinion; International Application No. PCT/US2023/017962; Aug. 25, 2023.
International Search Report and Written Opinion; International Application No. PCT/US2023/017967; Aug. 29, 2023.
International Search Report and Written Opinion; International Application No. PCT/US2023/017899; Aug. 30, 2023.
International Search Report and Written Opinion; International Application No. PCT/US2023/017951; Aug. 24, 2023.
International Search Report and Written Opinion; International Application No. PCT/US2023/017958; Aug. 30, 2023.
PCT/ISA206 Invitation to Pay Additional Fees; International International Application No. PCT/US2023/017899; Jun. 2, 2023.
PCT/ISA206 Invitation to Pay Additional Fees; International International Application No. PCT/US2023/017921; Jun. 13, 2023.
PCT/ISA206 Invitation to Pay Additional Fees; International International Application No. PCT/US2023/017937; Jun. 12, 2023.
PCT/ISA206 Invitation to Pay Additional Fees; International International Application No. PCT/US2023/017951; Jun. 21, 2023.
PCT/ISA206 Invitation to Pay Additional Fees; International International Application No. PCT/US2023/017953; Jun. 21, 2023.
PCT/ISA206 Invitation to Pay Additional Fees; International International Application No. PCT/US2023/017955; Jun. 12, 2023.
PCT/ISA206 Invitation to Pay Additional Fees; International International Application No. PCT/US2023/017958; Jun. 22, 2023.
PCT/ISA206 Invitation to Pay Additional Fees; International International Application No. PCT/US2023/017962; Jun. 16, 2023.
PCT/ISA206 Invitation to Pay Additional Fees; International International Application No. PCT/US2023/017967; Jun. 22, 2023.
International Search Report and Written Opinion; International Application No. PCT/US2023/017933; Jun. 30, 2023.
International Search Report and Written Opinion; International Application No. PCT/US2023/017939; Jul. 7, 2023.
International Search Report and Written Opinion; International Application No. PCT/US2023/017946; Jun. 29, 2023.

* cited by examiner

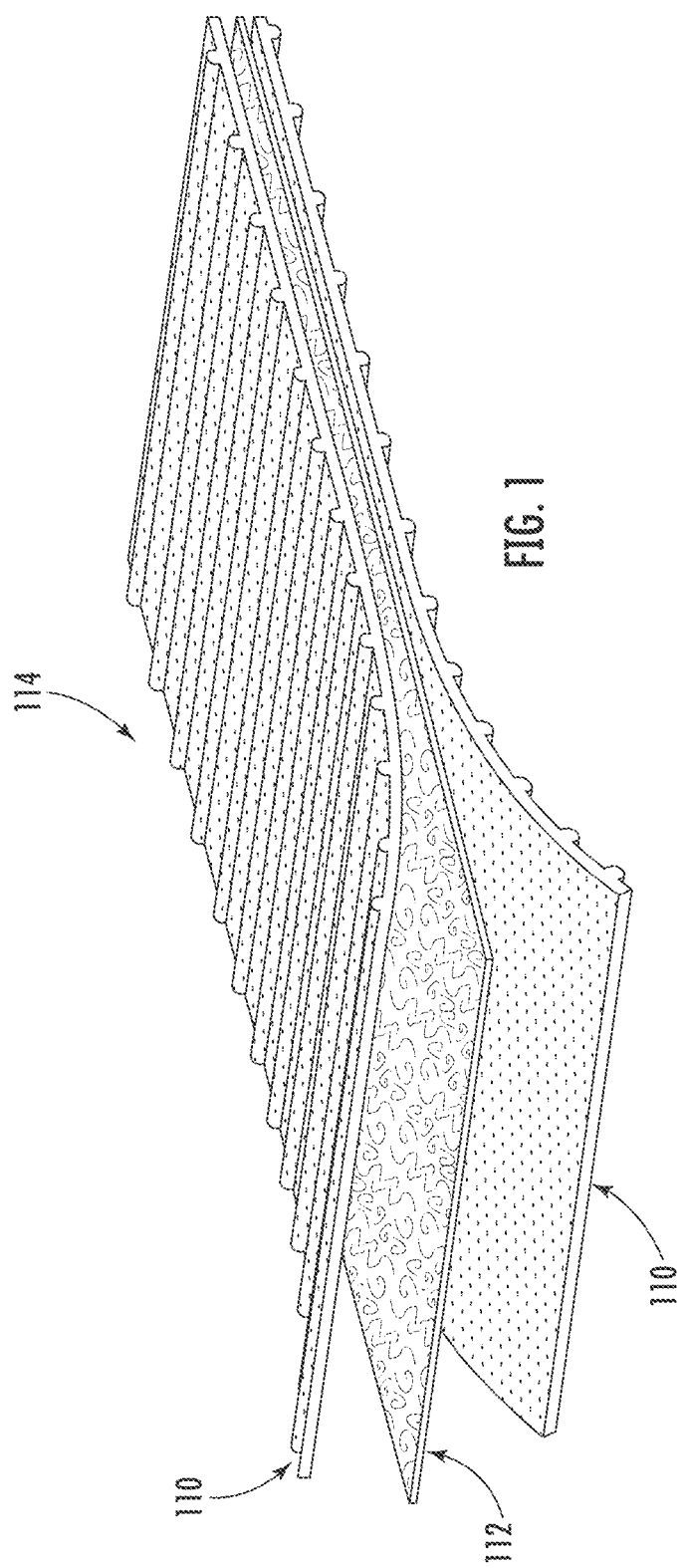

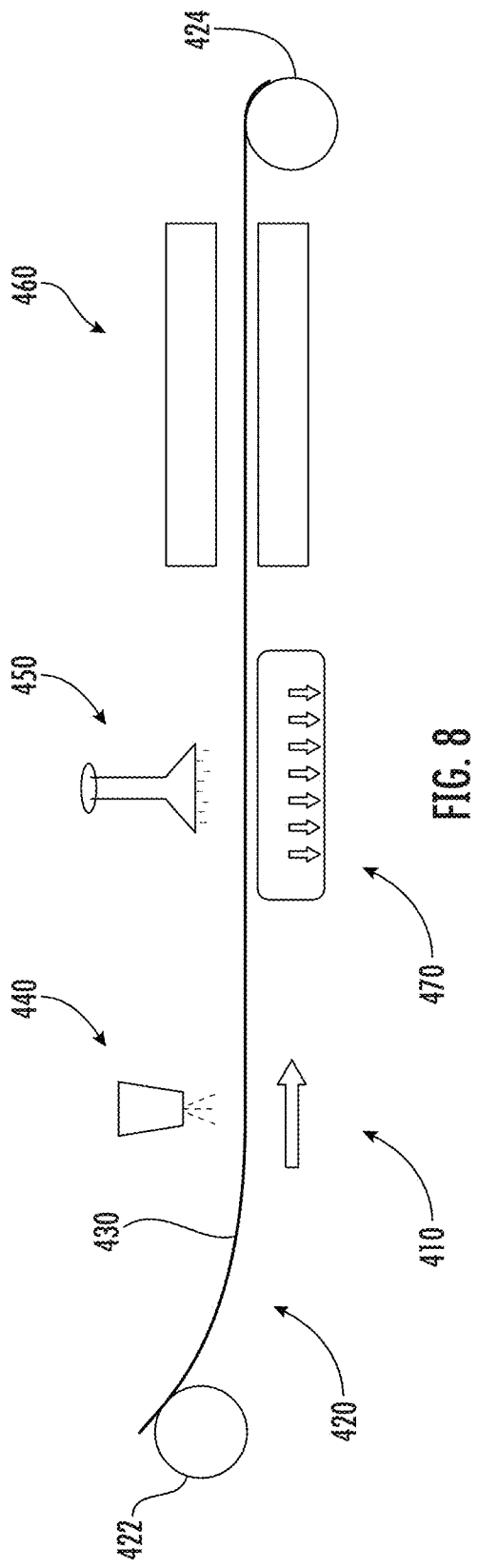

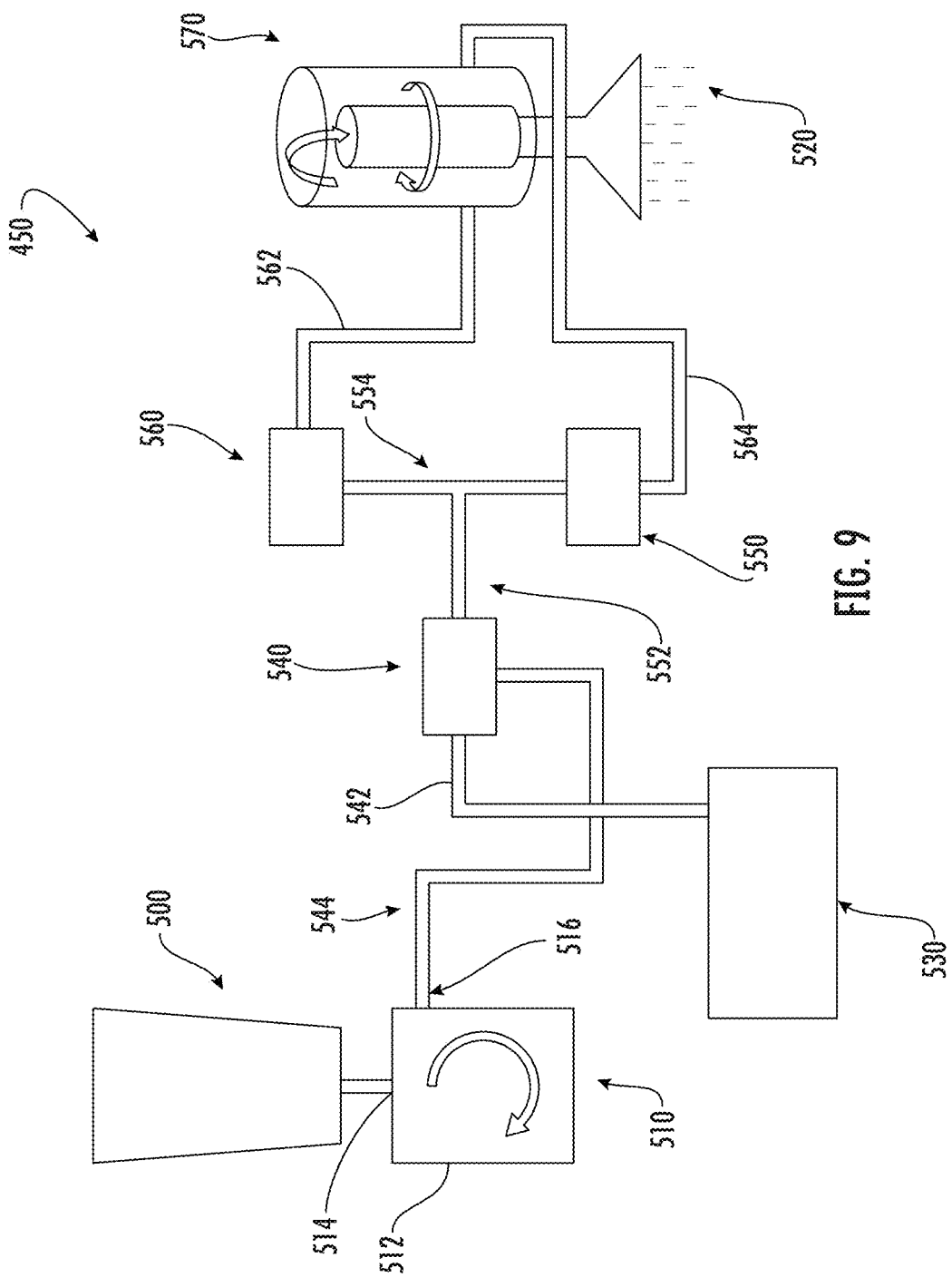

APERTURED POLYMER SHEETS INCORPORATING NANOPARTICLES

CROSS-REFERENCE TO RELATED APPLICATIONS

This application claims the benefit of U.S. Provisional Application Ser. No. 63/328,959, filed Apr. 8, 2022, the complete disclosure of which is incorporated herein by reference for all purposes. This application is also related to commonly assigned, U.S. provisional patent applications Ser. Nos. 63/328,970, 63/328,983, 63/328,998, 63/329,009, 63/329,018, 63/329,137, 63/329,146, 63/329,155, 63/329,158, 63/329,161 and 63/329,162 all filed Apr. 8, 2022, the complete disclosures of which are incorporated herein by reference in their entirety for all purposes.

TECHNICAL FIELD

This description generally relates to apertured polymeric sheets, support members and other materials incorporating nanoparticles, and filters formed from such materials.

BACKGROUND

Apertured polymeric sheets or films are lightweight, nonwoven materials that include apertures, pores or perforations. The apertures may be embossed in a pattern (such as circular, diamond shaped, hexagonal, oblong, triangular, rectangular, etc.) and then stretched until apertures form in the thinned out areas created by the embossing. Such an apertured substrate can be formed from many polymers, such as polypropylene, polyethylene, high density polyethylene ("HDPE") and the like. The polymer layer may, for example, comprise an extruded film.

Apertured films are used in many applications, including finger bandages, surgical gowns, drapes, masks, teeth whitening strips, hydrogel scrims, nasal support materials, electrode support products, filters, food processing, packaging and textile applications, agricultural products, food packaging, such as cheese production netting and many more. An apertured film is available commercially and is marketed under the trademark Delnet®.

One particularly useful application for apertured films is as a support product for air and liquid filtration devices. Support sheets or membranes are often used in filters to provide structural support for the filter layer. These sheets are often apertured to permit filtrate to pass through the sheets to the underlying filter media. Typically, a cross-flow pressure drop may be observed across the support membrane when filtering at a given rate, indicating an increase in the amount of force needed to push a fluid through the filter. Minimizing the cross-flow pressure drop across a given support membrane can decrease the operational costs of filtering.

What is needed, therefore, are improved support membranes and filters comprising such membranes. It would be desirable to reduce the overall pressure drop across the support membranes to improve the efficiency of such filters.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

Apertured polymeric layers, sheets, mesh or films are provided that include one or more apertures, pores or perforations and incorporate nanoparticles within the polymer layer. In certain embodiments, the apertured sheets comprise support membranes in gas or liquid filters. The apertured polymeric sheet can provide the support for a filter media, for example, or a separate layer may be attached to provide the structural support required. The nanoparticles capture contaminants and reduce the overall pressure drop across the support membranes to improve the efficiency of such filters.

In one aspect, a polymeric sheet comprises at least one polymer layer having one or more apertures for flow of gas or liquid therethrough, and a plurality of nanoparticles disposed within the polymer layer such that the nanoparticles are disposed between a first surface of the polymer layer and a second surface opposite the first surface. The nanoparticles filter contaminants passing through the polymeric sheet.

In certain embodiments, the polymeric sheet is an extruded film. The apertures may comprise pores or perforations. The apertures may have any suitable shape, such as diamond shaped, circular, square, or combinations thereof. In certain embodiments, the sheet has a plurality of pleats extending across a surface of the polymer layer. Sheets of multiple types can be combined and one or more layers may be used. Sheets of different materials can be combined.

The polymer layer can be selected from a group consisting of a polypropylene film, a high density polyethylene film, and a polylactic acid film. The polymeric sheet can further comprise a mesh, netting, fabric, knit, or weave.

In certain embodiments, the polymer layer is a substantially rigid support layer for a gas filter. In other embodiments, the polymer layer is a flexible surface layer for a face mask. In further embodiments, the polymer layer is a flexible surface layer for a finger bandage pad.

The polymer layer may be co-extruded to form an adhesive bonding layer. The polymer layer may have a first surface and a second surface opposite the first surface, and the nanoparticles may form a gradient within the polymer layer such that a density of the nanoparticles decreases from the first surface to the second surface. In embodiments, the nanoparticles are substantially uniformly dispersed throughout the polymer layer.

In some embodiments, the nanoparticles may be added into the substrate from both the first and second surfaces. In these embodiments, the area density or "add-on amount" at the first and second surfaces may be substantially equal to each other, or they may be different depending on the application. In these embodiments, the area density or "add-on amount" that is present in the middle of the substrate is lower than at the outer surfaces. For example, the area density in the middle of the substrate may be about 75% of the area density at the outer surfaces, or it may be about 50%, 40% or 25%.

In certain embodiments, the nanoparticles may comprise an add-on amount of about 0.1 grams/m$^2$ to about 20 grams/m$^2$, preferably at least about 2.0 grams/m$^2$. The specific add-on amount or area density may depend on the application. For example, Applicant has found that a higher area density or add-on amount will increase the efficiency of the nonwoven material in filtering out contaminants.

In certain embodiments, the nanoparticles have been deposited into the substrate through the first surface. The nanoparticles penetrate through the first surface into the "depth" of the substrate between the first and second surfaces. As used herein, the term "in depth" means that the nanoparticles are dispersed beyond a first surface of the polymeric sheet such that at least some of the nanoparticles are disposed between first and second opposing surfaces in the internal structure of the polymeric sheet. In other embodiments, the nanoparticles penetrate substantially throughout the substrate from first surface to second surface. In other embodiments, the nanoparticles are dispersed through a portion of the polymeric sheet from the first surface to a location between the first and second surfaces. In some embodiments, the nanoparticles penetrate from the first surface at least 25% of the width or thickness between the first and second surfaces or more preferably at least about 50% of the thickness.

In some embodiments, the nanoparticles are distributed three-dimensionally in space relative to the supporting fiber, which may increase fiber surface area and micro-volumes within the polymeric sheet. The three-dimensional distribution also provides resistance against complete blockage of a particular portion of the polymeric sheet, which is particularly useful in filter media as it allows fluid (e.g., air and other gases) to pass through the filter, thereby reducing the overall pressure drop across the filter.

In certain embodiments, the polymeric sheet has a thickness from the first surface to the second surface, wherein the nanoparticles are disposed within the polymeric sheet in at least 70% of the width from the first surface to the second surface. In examples, the nanoparticles are disposed within the polymeric sheet in at least 90% of the thickness from the first surface to the second surface.

In certain embodiments, the nanoparticles are isolated within a fluid and dispersed through the first surface of the polymeric sheet. The fluid may, for example, be a gaseous medium such as air, helium, nitrogen, oxygen, carbon dioxide and the like. The nanoparticles may be dispersed from this gaseous medium via a gas stream, aerosol, vaporizer, spray or other suitable delivery mechanism.

The nanoparticles may comprise any suitable material, such as glass, biosoluble glass, ceramic materials, acrylic, carbon, metal, such as alumina, polymers (such as nylon, polyethylene terephalate, and the like), polyvinyl chloride (PVC), polyolefin, polyacetal, polyester, cellulous ether, polyalkylene sulfide, poly (arylene oxide), polysulfone, modified polysulfone polymers and polyvinyl alcohol, polyamide, polystyrene, polyacrylonitrile, polyvinylidene chloride, polymethyl methacrylate, polyvinylidene fluoride and any combination thereof.

The fibers of the substrate can be manufactured by any method, including, without limitation, the air laid method, spinneret, gel spinning, melt spinning, wet spinning, dry spinning, islands-in-a sea staple or spunbond, segmented pie staple or spunbond, and others. The fibers contemplated may have many shapes in cross-section, including without limitation, circular, kidney bean, dog bone, trilobal, barbell, bowtie, star, Y-shaped and others.

The fibers may be artificial or natural fibers. Suitable materials for the fibers include, but are not limited to, polypropylene, polyesters (PET), PEN polyester, PCT polyester, polypropylene, PBT polyester, co-polyamides, polyethylene, high density polyethylene ("HDPE"), LLDPE, cross-linked polyethylene, polycarbonates, polyacrylates, polyacrylonitriles, polyfumaronitrile, polystyrenes, styrene maleic anhydride, polymethylpentene, cyclo-olefinic copolymer or fluorinated polymers, polytetrafluoroethylene, perfluorinated ethylene and hexfluoropropylene or a copolymer with PVDF like P(VDF-TrFE) or terpolymers like P(VDF-TrFE-CFE), propylene, polyimides, polyether ketones, cellulose ester, nylon and polyamides, polymethacrylic, poly (methyl methacrylate), polyoxymethylene, polysulfonates, acrylic, styrenated acrylics, pre-oxidized acrylic, fluorinated acrylic, vinyl acetate, vinyl acrylic, ethylene vinyl acetate, styrene-butadiene, ethylene/vinyl chloride, vinyl acetate copolymer, latex, polyester copolymer, carboxylated styrene acrylic or vinyl acetate, epoxy, acrylic multipolymer, phenolic, polyurethane, cellulose, styrene or any combination thereof. Other conventional fiber materials are contemplated.

The fibers may include fibers of different sizes, with the fibers generally having diameters ranging from about 1 to about 1000 microns with lengths ranging from about one half to three inches.

In certain embodiments, the fibers are biocomponent fibers having a core and a sheath. In embodiments, the core is eccentric with the sheath. In other embodiments, the core is concentric with the sheath.

In certain embodiments, the nanoparticles are isolated within a fluid and dispersed through a first surface of the polymer layer. The polymer layer may comprise fibers having an electrostatic charge. The nanoparticles can be selected from a group consisting of carbon fibers, glass fibers, polypropylene fibers, nylon fibers, polylactide fibers, and combinations thereof.

In certain embodiments, the polymeric sheet (i.e., the fibers and/or the nanoparticles) may be electrostatically charged such that, for example, contaminants are captured both with mechanical and electrostatic filtration. The bond between the fibers and the nanoparticles may also be enhanced by electrostatically charging the nanoparticles, the fibers or both. For example, in certain embodiments, the fibers are electrostatically charged such that mechanical filtration can be achieved by nanoparticles while electrostatic filtration can be achieved through electret substrate. The electrostatic or electret substrate could be high loft triboelectric filter media made by carding and needling. In one of the embodiments, the nanoparticles are preferably deposited into the substrate before needling and then both electrostatic fibers and nanoparticles are needled together.

In certain embodiments, the polymeric sheet further comprises a binding agent within the polymer layer bonding the nanoparticles to the polymer layer. The binding agent can comprise a material selected from a group consisting of starch, dextrin, guar gum, PVOH and synthetic resins.

In another aspect, a gas filter comprises a filter media and a substantially rigid support layer bonded to the filter media. The support layer includes fibers and a plurality of nanoparticles disposed within the support layer. The nanoparticles can be configured to filter contaminants passing through the support layer. The support layer can comprise at least one extruded polymer film having one or more apertures for flow of gas or liquid therethrough.

In certain embodiments, the polymer film has a first surface and a second surface opposite the first surface, and at least a portion of the nanoparticles are disposed between the first surface and the second surface. The polymer film can comprise at least one crease to form a pleat within the sheet. The apertures can comprise pores or perforations. The apertures can have a shape such as hexagonal, circular, square or diamond shaped.

In one embodiment, the support layer is substantially porous. In an exemplary embodiment, the support layer has a porosity value of at least 0.5 or 50%, preferably at least 0.8 or 80% and more preferably about 0.86 or 86%.

In certain embodiments, the gas filter further includes a plurality of pleats extending across a surface of the polymer layer. The polymer film can be selected from a group consisting of a polypropylene film, a high density polyethylene film, and a polylactic acid film. The gas filter can further include a mesh, netting, fabric, knit or weave.

In certain embodiments, the nanoparticles are isolated within a fluid and dispersed through a first surface of the polymer layer. The support layer can comprise fibers having an electrostatic charge. The nanoparticles can be selected from a group consisting of carbon fibers, glass fibers, polypropylene fibers, nylon fibers, polylactide fibers, and combinations thereof.

In certain embodiments, the gas filter further comprises a binding agent within the polymer layer bonding the nanoparticles to the polymer layer. The binding agent can comprise a material selected from a group consisting of starch, dextrin, guar gum, PVOH and synthetic resins.

In another aspect, a composite material comprising a substrate having pores within an internal structure and a plurality of nanoparticles within the internal structure of the substrate. The nanoparticles form a gradient within the substrate such that a density of the nanoparticles decreases from a first surface to an opposing second surface of the substrate.

The substrate can comprise a fibrous material. The fibrous material can be a plurality of microfibers, the microfibers having a dimension of 1 micrometer or more.

In certain embodiments, the microfibers are formed in a process selected from a group consisting of spunbond process, a melt blown process, and electrospinning process. The nanoparticles can extend below the outer surface by a distance of between about 1 millimeter and about 3 millimeters.

The recitation herein of desirable objects which are met by various embodiments of the present description is not meant to imply or suggest that any or all of these objects are present as essential features, either individually or collectively, in the most general embodiment of the present description or in any of its more specific embodiments.

BRIEF DESCRIPTION OF THE DRAWINGS

FIG. 1 illustrates a gas filter with first and second support membranes and a filter media;

FIG. 8 schematically illustrates a system for manufacturing nonwoven material within a substrate;

FIG. 9 schematically illustrates a system for converting clusters of nanofibers into individual nanoparticles;

DETAILED DESCRIPTION OF THE EMBODIMENTS

Figure 2A:
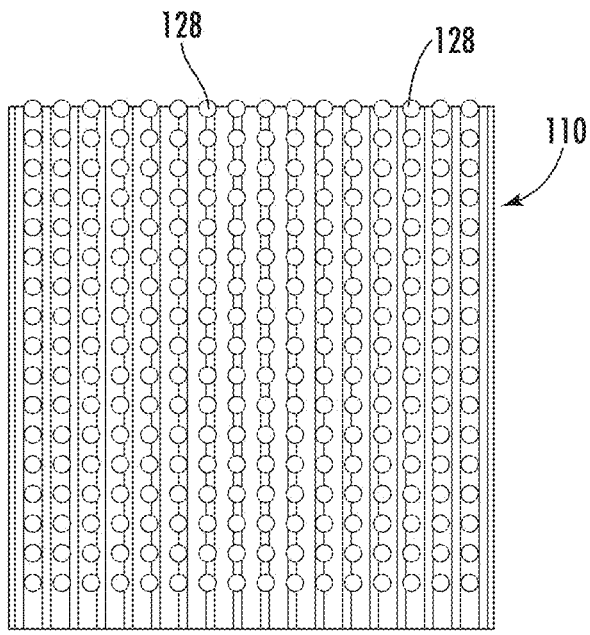
FIGS. 2A and 2B illustrate apertured films for use as support membranes.

This description and the accompanying drawings illustrate exemplary embodiments and should not be taken as limiting, with the claims defining the scope of the present description, including equivalents. Various mechanical, compositional, structural, and operational changes may be made without departing from the scope of this description and the claims, including equivalents. In some instances, well-known structures and techniques have not been shown or described in detail so as not to obscure the description. Like numbers in two or more figures represent the same or similar elements. Furthermore, elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment. Moreover, the depictions herein are for illustrative purposes only and do not necessarily reflect the actual shape, size, or dimensions of the system or illustrated components.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Except as otherwise noted, any quantitative values are approximate whether the word "about" or "approximately" or the like are stated or not. The materials, methods, and examples described herein are illustrative only and not intended to be limiting.

Apertured polymeric layers, sheets, mesh or films are provided that include one or more apertures, pores or perforations and incorporate nanoparticles within the polymer layer. The apertured films may be configured for use in many applications, including finger bandages, surgical gowns, drapes, masks, teeth whitening strips, hydrogel scrims, nasal support materials, electrode support products, filters, food processing, packaging and textile applications, agricultural products, food packaging, such as cheese production netting and many more.

In certain embodiments, the apertured sheets comprise support membranes in gas or liquid filters. The nanoparticles reduce the overall pressure drop across the support membranes to improve the efficiency of such filters.

As used herein, the term "nanoparticle" means any particle that has a dimension less than 1 micron in at least one axis or dimension. For example, a fiber having a diameter or width less than a micrometer and a length greater than 1 micrometer is a nanoparticle as used herein.

In certain embodiments, each individual nanoparticle may be a small particle that ranges between about 1 to about 1000 nanometers in size, preferably between about 1 to about 650 nanometers. The particle size of at least half of the particles in the number size distribution may measure 100 nanometers or below. The majority of the nanoparticles will typically be made up of only a few hundred atoms. The material properties change as the size of the nanoparticles approaches the atomic scale. This is due to the surface area to volume ratio increasing, resulting in the material's surface atoms dominating the material performance. Owing to their very small size, nanoparticles have a very large surface area to volume ratio when compared to bulk material, such as powders, plate, sheet or larger fibers. This feature enables nanoparticles to possess unexpected optical, physical and chemical properties, as they are small enough to confine their electrons and produce quantum effects.

In some embodiments, the nanoparticles comprise nanofibers that have at least one dimension less than 1 micron (i.e., diameter, width, height, or the like depending on the cross-sectional shape of the fiber). The nanofibers may have a continuous length, or the nanofibers may have discrete length, such as 1 to 100,000 microns, preferably between about 100 to 10,000 microns.

The substrate discussed herein may comprise a structure of individual fibers or threads which are interlaid, interlocked or bonded together. Nonwoven fabrics may include sheets or web structures bonded together by entangling fiber or filaments (and by perforating films) mechanically, thermally, or chemically. They may be substantially flat, porous sheets that are made directly from separate fibers or from molten plastic or plastic film. Examples of suitable nonwoven materials include, but are not limited to, fibers, layers or webs that are meltblown, spunbond or spunlace, heat-bonded, bonded carded, air-laid, wet-laid, co-formed, needlepunched, stitch, hydraulically entangled or the like.

In certain embodiments, the substrate may comprise a knitted and/or woven material. The knitted material may comprise any knitting pattern suitable for the desired application. Suitable knitted materials for filter applications include weft-knit, warp knit, knitted mesh panels, compressed knitted mesh and the like. Suitable woven materials for filter applications include textile filter media, such as monofilament fabrics, multifilament fabrics, nylon mesh, polyester mesh, polypropylene mesh and the like. Woven textiles may be used in, for example, mesh filter press cloths, woven filter pads and other die cut pieces, centrifuge filter bags, liquid filter bags, dust collector bags, bed dryer bags, rotary drum filters, filter belts, leaf filters, roll media and the like.

In some embodiments, the substrate may include a structure comprising shortcut fibers and/or filaments that are intermingled or entangled. A shortcut fiber as used herein means a fiber of finite length. A filament as used herein means a fiber having a substantially continuous length. In some embodiments, the substrate may comprise shortcut coarse, microfibers and/or fine fibers. As used here in a "fine fiber" means fibers having diameter less than 1 micron, a "coarse fiber" means fibers having diameter more than 10 micron, and a microfiber is a synthetic fiber having a diameter of less than 10 microns.

In certain embodiments, the nanoparticles are dispersed "in depth" within the substrate. As used herein, the term "in depth" means that the nanoparticles are dispersed beyond a first surface of the substrate such that at least some of the nanoparticles are disposed between first and second opposing surfaces into the internal structure of the substrate or media. In certain embodiments, the nanoparticles are dispersed throughout substantially the entire media from the first surface to the opposing second surface. In other embodiments, the nanoparticles are dispersed through a portion of the media from the first surface to a location between the first and second surfaces.

In some embodiments, the nanoparticles are distributed three-dimensionally in space relative to the supporting substrate, which may increase fiber surface area and microvolumes within the nonwoven material. The three-dimensional distribution also provides resistance against complete blockage of a particular portion of the nonwoven material, which is particularly useful in filter media as it allows fluid (e.g., air and other gases) to pass through the filter, thereby reducing the overall pressure drop across the filter.

In other embodiments, the nanoparticles are disposed in a density gradient across the thickness of the substrate such that a higher density of nanoparticles is disposed near one surface than the opposite surface, or a higher density of nanoparticles is disposed on the surfaces as compares to the middle section of the substrate. The density gradient may be substantially linear, it may reduce in a series of discrete steps, or the gradient may be random (i.e., a generally reduction in density that is not linear or stepped). This density gradient provides a number of advantageous features for certain applications, such as filters (as discussed below).

The nanoparticles may comprise any suitable material, such as glass, biosoluble glass, ceramic materials, acrylic, carbon, metal, such as alumina, polymers (such as nylon, polyethylene terephalate, and the like), polyvinyl chloride (PVC), polyolefin, polyacetal, polyester, cellulous ether, polyalkylene sulfide, poly (arylene oxide), polysulfone, modified polysulfone polymers and polyvinyl alcohol, polyamide, polystyrene, polyacrylonitrile, polyvinylidene chloride, polymethyl methacrylate, polyvinylidene fluoride and any combination thereof.

In some embodiments, nanoparticles may be produced as bicomponent segmented pie and islands in the sea. Then filaments are drawn so much so that submicron filaments are obtained. Continuous filament nanofibers are cut according to desired length, preferably between about 100 to about 10000 microns.

In some embodiments, nanoparticles are absorbents and adsorbents. In some embodiments, nanoparticles are activated carbon fibers or activated carbon powders. In some embodiments, nanoparticles are catalytic particles or catalytic fibers. In some embodiments, nanoparticles can be obtained by feeding a submicron fiber nonwoven in a shredder or a crusher or edge trimmer machine where bonded nonwoven gets in and shortcut fiber comes out. For instance, low weight biocomponent meltblown or nano meltblown fabric can be fed into a shredder and submicron nanoparticles can be obtained.

In some embodiments, different nanoparticles may be mixed. For examples, nanofibers and nanobeads can be mixed. Two different nanofibers with different melting points can also be mixed so that lower melting point nanoparticle can act as binder for higher melting point nanofibers. Nanoparticles with different diameters and different lengths can be mixed as well.

In some embodiments, nanoparticles are chosen from environmentally sustainable raw materials. Nanoparticles may compromise bio soluble glass nanofibers, biodegradable nanoparticles, compostable nanoparticles, or recyclable compositions.

Nanoparticles of different types can be combined. Some of the nanoparticles can be functional nanoparticles. For example, the functional nanoparticles may include activated carbon and/or antimicrobial material deposited onto and/or attached to the fibers in the nonwoven material. This may improve the gas absorption efficiency of the fibers and the effectiveness of killing bacteria. In addition, a composite product of an apertured sheet with nanoparticles of glass and carbon deposited into it would provide filtration and odor-removing functionality as a filter medium.

In some embodiments, the nanoparticles are attached to the substrate via mechanical entanglement. This mechanical bond can be supplemented with a binding agent and/or an adhesive, as discussed in more detail below. In certain embodiments, the nanoparticles are not crimped (i.e., they do not include significant wavy, bent, curled, coiled sawtooth or similar shape associated with the nanoparticle in a relaxed state). In other embodiments, the nanoparticles may have a crimped body structure with a discrete length. For instance, when these crimped nano-fibers having a discrete length are attached to the substrate they entangle among themselves and also with, onto, and around, the substrate. In other embodiments, the attachment of the nano-fibers to the substrate is accomplished via electrostatic charge attraction and/or Van der Waals force attraction between the substrate and the nanoparticles.

Filter media and filters, such as air filters, face masks, gas turbine and compressor air intake filters, panel filters and the like, are also provided that include nanoparticles dispersed in depth within the filter media. In some embodiments, the filters include one or more support layers bonded to the filter media. The support layers and/or the filter media may include nanoparticles dispersed in depth within the layer(s). In some embodiments, polymer layers, membranes or films are provided that include one or more apertures for flow of gas or liquid therethrough with nanoparticles disposed in depth within the polymer layer. In other embodiments, the substrate comprises a nonwoven material that forms a flexible surface layer for a finger bandage pad, a face mask or the like.

Systems, devices and methods are provided herein for producing the composite material and the products containing the composite material (e.g., gas filters). Systems and methods are also provided for isolating individual nanoparticles in a gaseous medium, such as air, helium, nitrogen, oxygen, carbon dioxide and the like (instead of a liquid) and are capable of being dispersed into another product, film, layer or substrate via a gas stream, aerosol, vaporizer, spray or other suitable delivery mechanism.

While the following description is primarily presented with respect to composite materials and filter media, it should be understood that devices and methods disclosed herein may be readily adapted for use in a variety of other applications. For example, the composite material disclosed herein may be useful in household cleaning products, roofing and flooring products, automobile upholstery and headliners, reusable bags, wallcoverings, filtration devices, insulation and the like. In addition, the individual nanoparticles that are isolated and generated may be utilized in various coatings, composites and/or additives in, for example, polymers, food packaging, flame retardants, fuel cells, batteries, capacitors, nanoceramics, lights, material fabrication, manufacturing methods, reinforcement for composites, cement and other materials, medical diagnostic applications, medical therapeutic devices or therapies, tissue engineering, such as scaffolds for bone or tissue repair, potable waters, industrial process fluids, food and beverage products, pharmaceutical and biological agents, tissue imaging, medical therapy delivery, environmental applications, such as biodegradable compounds and the like.

Referring to FIG. 1, a composite filter member 114 includes an internal filter substrate 112 and one or more filter support members or membranes 110. Support members 110 may be formed from an extruded sheet of a polymer, such as a polypropylene film, a high density polyethylene film a polylactic acid film or a thermoplastic polymeric material such as an extrudable fluoroplastic material, in embodiments a perfluoroalkoxy alkane (PFA) copolymer made from co-monomers polytetrafluoroethylene and perfluoroalkyl vinyl ether. However, other polymeric materials such as fluoroplastics may be used e.g., ethylenechlorotrifluorethyle (ECTFE); ethylenetetrafluroethylene (ETFE) of polyvinylidene fluoride (PVDF).

In certain embodiments, support membranes 110 comprise individual nanoparticles dispersed in depth within the membrane 110. The nanoparticles allow the support membrane to filter at least some of the contaminants passing through filter membrane 114, i.e., in addition to the filtering provided by internal filter substrate 112. In other embodiments, the filter substrate 112 and/or the support membranes 110 include such nanoparticles.

Fluoroplastic material such as PFA is highly desirable for use in filters intended to clean semiconductor components and in other environments where extreme cleanliness is required and the possibility of contamination is minimized. Such support membranes are designed to both direct fluids to be filtered along their surfaces and also for directing the fluids through the structure into the underlying filter substrate to remove undesired particulates from the filtrate.

Figure 2B:
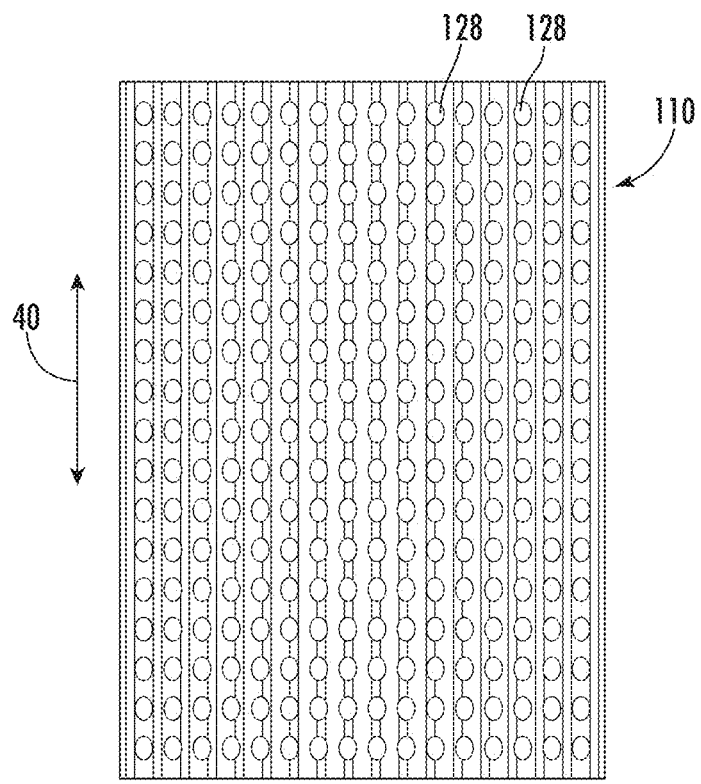
Figure 3A:
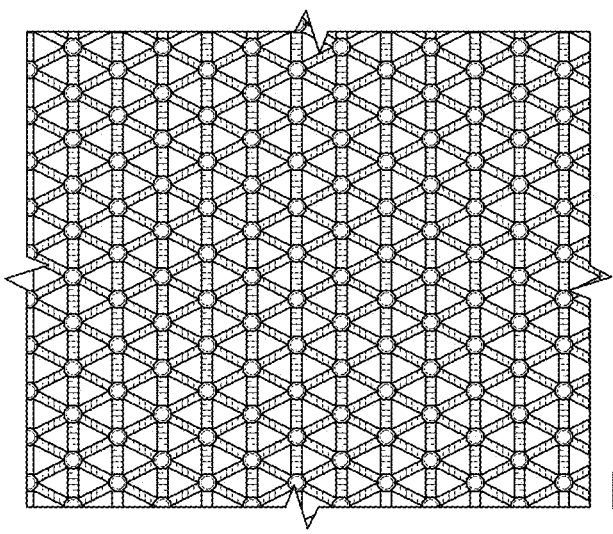
FIGS. 3A-3E illustrate different embodiments of apertured films with nanoparticles incorporated into the films.
Figure 3B:
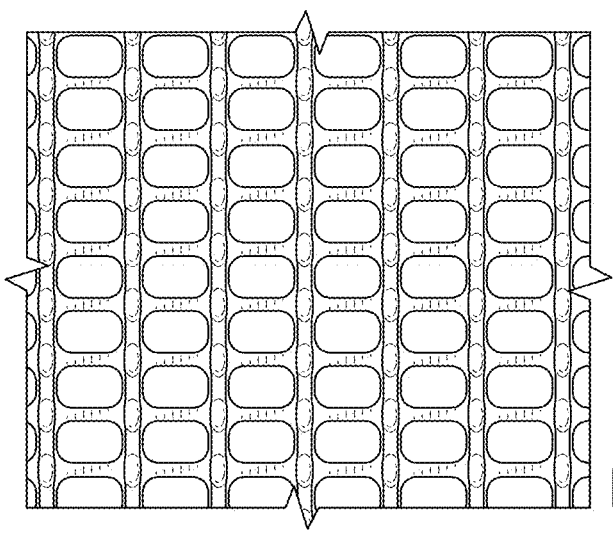
Figure 3C:
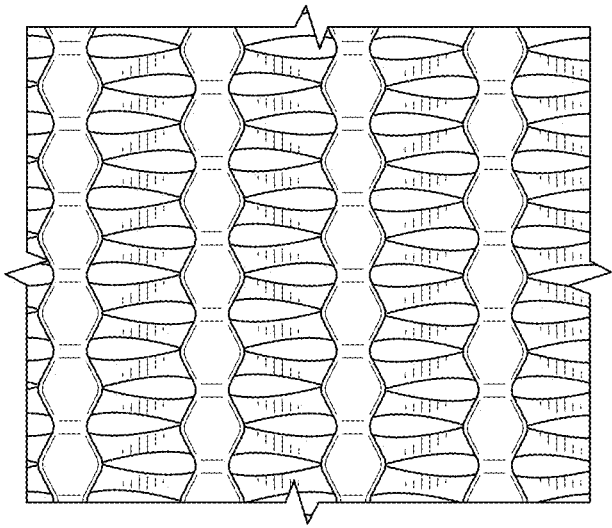
Figure 3D:
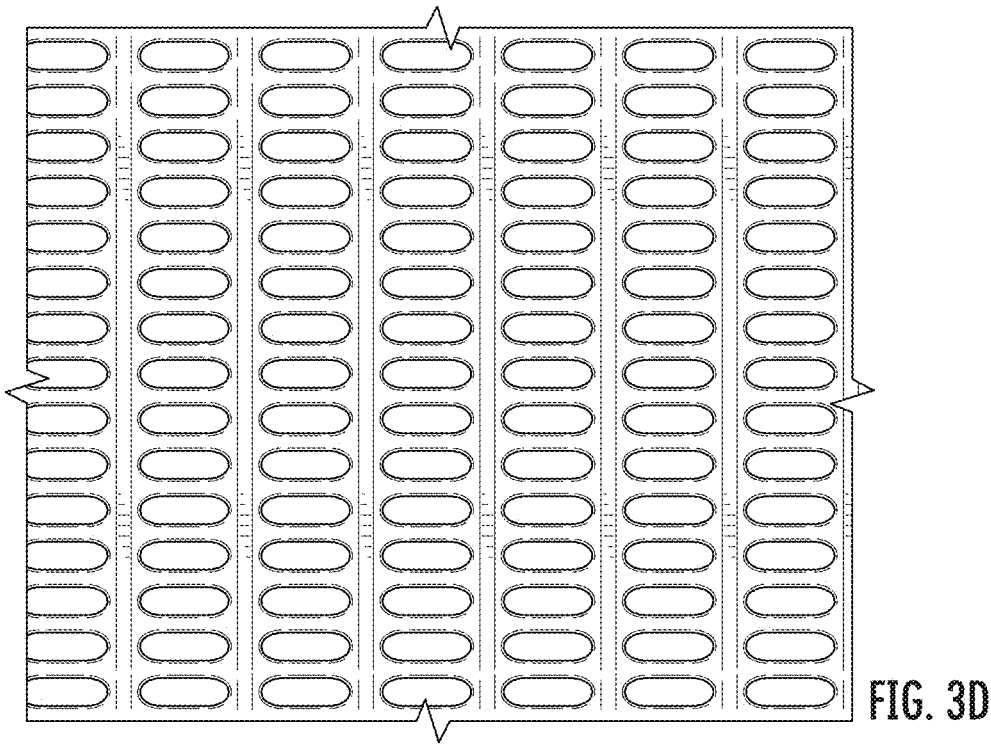
Figure 3E:
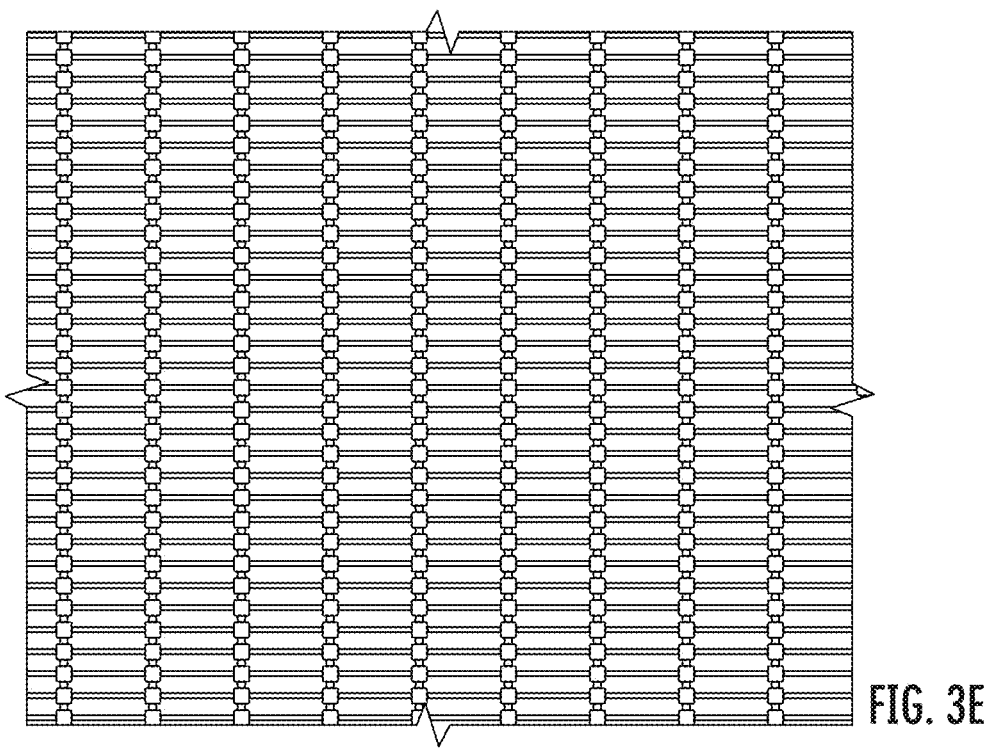

As shown in FIGS. 2A and 2B, support membranes 110 may include a plurality of apertures 128. Apertures are preferably round in shape although it will be recognized that other shapes are possible, such as square, rectangular, hexagonal, triangular and the like. The substrate may be wound into a roll and subsequently unwound and directed through a punch press to form apertures 128 through the Z-direction in a desired, predetermined pattern (FIG. 2A). Alternatively, the sheet, after being set, can be directed in a continuous operation through a punch press to form the predetermined pattern of apertures 128 therein.

Referring to FIG. 2B, after aperturing, the filter support members can be stretched in the machine direction, as indicated by the double-headed arrow 40, to elongate the apertures 128 for providing greater open area for passage of the fluid to be filtered by the filter media or substrate 112. The apertured substrate may be made using any suitable method known in the art. A more complete description of such a composite filter medium can be found in PCT Application Serial No. US2021/011217, the complete disclosure of which is hereby incorporated herein by reference in its entirety for all purposes.

In an alternative embodiment, the support membrane 110 may be porous (i.e., rather than, or in addition to, having apertures 128). In this embodiment, the additional fluid flow can be accomplished with a substantially porous support membrane. In an exemplary embodiment, the support membrane has a porosity value of at least 0.5 or 50%, preferably at least 0.8 or 80% and more preferably about 0.86 or 86%. Porosity value is defined as the nonsolid or pore-volume fraction of the total volume of the material.

The present support membranes for filters may be prepared by any methods known by those of ordinary skill in the art. In one example shown in FIGS. 2A and 2B, the support membranes include ribs. For example, support membranes may be made by extruding a polymer material to form of a sheet and then passing the sheet through a nip region provided by opposed rollers; at least one of the rollers having an outer surface with counter-sunk grooves. Counter-sunk grooves in one roller are aligned with an outer surface or counter-sunk grooves of the other roller in the nip region to form a ribbed sheet having ribs upstanding from at least one surface of the sheet. Alternatively, ribs may be formed during the extrusion process or known methods of embossing. Once the ribs are formed the support membrane may be wound into a roll and subsequently unwound and directed through a press to form apertures through the Z-direction thereof in a desired, predetermined pattern. Alternatively, after being set, the support membrane can be directed in a continuous operation through a punch press to form the predetermined pattern of apertures therein, as best seen in FIG. 2A. Optionally, the support membrane can be stretched in the machine direction (indicated by the double-headed arrow in FIG. 2B) to elongate the apertures for providing greater open area for passage of fluid to be filtered by, for example, a filter layer or substrate.

FIGS. 3A through 3E show several examples of apertured films that can be used as the substrate for the composite material. Apertures can be provided in a variety of patterns having one or more shapes. Sheets of multiple types can be combined and one or more layers may be used. Sheets of different materials can be combined. The apertured polymeric sheet can provide the support for a filter media, for example, or a separate layer may be attached to provide thee structural support required. In certain embodiments, the substrate may be included in a thin film or layer that includes apertures, pores or perforations. The apertures may be embossed in a pattern (such as circular, diamond shaped, hexagonal, oblong, triangular, rectangular, etc.) and then stretched until apertures form in the thinned out areas created by the embossing. Such an apertured substrate can be formed from many polymers, such as polypropylene, polyethylene, high density polyethylene ("HDPE") and the like. The polymer layer may, for example, comprise an extruded film. An apertured film is available commercially and is marketed under the trademark Delnet®. The substrate is provided in a roll and nanofibers are deposited into the substrate in a roll to roll process. FIGS. 3A-3E illustrate examples of apertured films that may be formed with the methods described herein.

In certain embodiments, a composite material his formed from the apertured sheet substrate and nanoparticles are deposited into the apertured sheet. The substrate has a first surface and a second surface opposing the first surface and a width or thickness defined between the first and second surfaces. In certain embodiments, the nanoparticles have been deposited into the substrate through the first surface. The nanoparticles penetrate through the first surface into the "depth" of the substrate between the first and second surfaces. In some embodiments, the nanoparticles penetrate from the first surface at least 25% of the width or thickness between the first and second surfaces or more preferably at least about 50% of the thickness. In other embodiments, the nanoparticles penetrate substantially throughout the substrate from first surface to second surface.

Figure 23A:
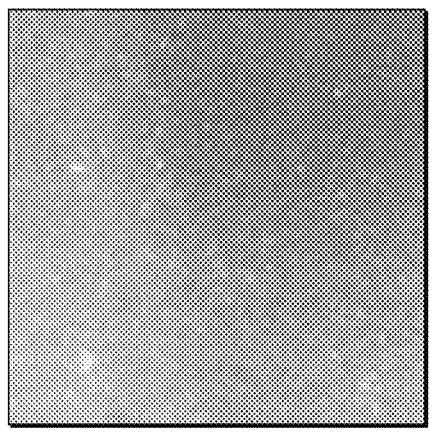
FIG. 23A is a photograph of a nonwoven material with nanoparticles dispersed in clumps or clusters throughout the material.
Figure 23B:
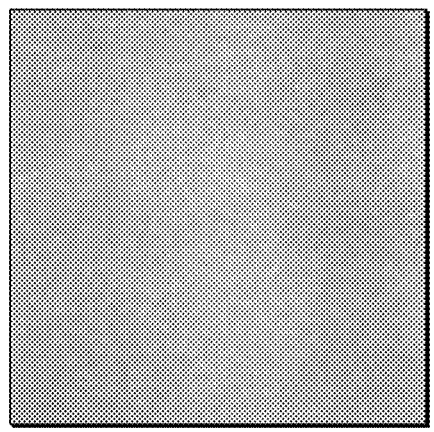
FIG. 23B is a photograph of a nonwoven material with nanoparticles dispersed substantially uniformly throughout the material.

The nanoparticles preferably comprise individual nanoparticles that have been broken up, separated and isolated from each other prior to dispersion into substrate (as shown in FIG. 23B). As such, the nanoparticles are not present in the composite product in a layer, and do not have significant clumping or bundles of nanofibers (as shown in FIG. 23A). This provides a greater dispersion of nanoparticles throughout the substrate, which in some applications, such as gas filters, provides a more efficient filtering capacity for filtering out contaminants. In addition, this provides a composite material with a greater area density of nanoparticles in grams per square meter (gsm) within the material or "add-on amount". The term "add-on amount" is used herein to mean the area density (gsm) of a material, fiber or particle in a thin layer, sheet or film of material.

In certain embodiments, the nanoparticles may comprise an add-on amount of about 0.1 grams/m$^2$ to about 20 grams/m$^2$, preferably at least about 2.0 grams/m$^2$. The specific add-on amount or area density may depend on the application. For example, Applicant has found that a higher area density or add-on amount will increase the efficiency of the nonwoven material in filtering out contaminants. Thus, the specific add-on amount of nanoparticles may depend on the desired efficiency of a filter media.

In certain embodiments, a composite material includes a substrate and nanoparticles that penetrate throughout the entire width of substrate. In certain embodiments, the nanoparticles are substantially dispersed throughout the substrate. In certain embodiments, the density of nanoparticles located at first surface differs by less than 50% of the density of nanoparticles dispersed within the central portion of substrate. In some embodiments, this difference is less than 25%, preferably less than 10%. In certain embodiments, the amount or number of individual nanoparticles dispersed within the central portion of substrate is at least about 50% of the amount of individual nanoparticles dispersed at or near first surface, preferably at least about 75% and more preferably at least about 90%. In other embodiments, nanoparticles are disposed in a density gradient from the first surface to second surface.

The contemplated nanoparticles can be manufactured by any method, including, without limitation, the air laid method, spinneret, gel spinning, melt spinning, wet spinning, dry spinning, islands-in-a sea staple or spunbond, segmented pie staple or spunbond, and others. Such methods are described in U.S. Pat. Nos. 4,406,950, 6,338,814, 6,616, 435, 6,861,142, 7,252,493, 7,300,272, 7,309,430, 7,422,071, 7,431,869, 7,504,348, 7,774,077 9,522,357, 9,993,761 and US Patent Publication No. 2009/266,759, the completed disclosures of which are hereby incorporated herein by reference for all purposes.

Figure 4:
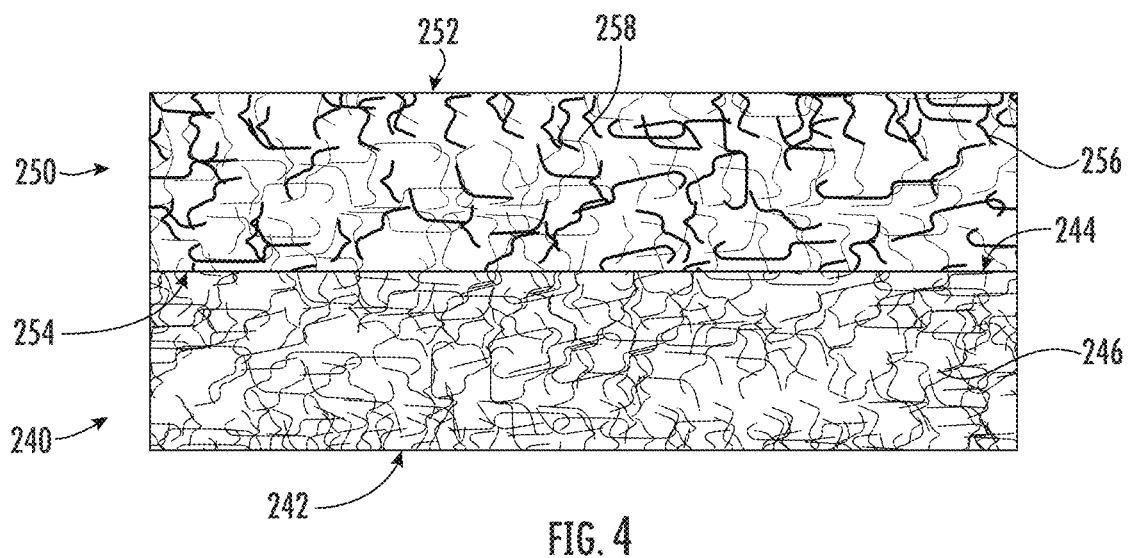
FIG. 4 illustrates a dual-layer filter media.

FIG. 4 illustrates a dual layer filter media that includes a first substrate 240 having a first surface 242 and a second surface 244 opposing the first surface. A second substrate 250 has a first surface 252 and a second surface 254 opposing the first surface. Second surface 244 of substrate 240 is bonded to second surface 254 of first substrate in any manner known to those skilled in the art. The substrates can comprise polymeric sheets, nonwoven materials, knits, weaves, meshes, etc. For example, first substrate 240 can comprise an apertured polymeric sheet and a second substrate 250 can comprise a nonwoven material of microfibers. In another example, first substrate 240 contains fibers 246 of relatively smaller linear density, e.g., on the order of 3 denier or less, and second substrate 250 contains fibers 256 of relatively larger linear densities, e.g., on the order of 3 denier or greater, such as 5 denier, 6 denier or larger. One or both of the substrates include individual nanoparticles (not shown) dispersed throughout and bonded to the substrate and/or retained by the substrate. Dual layer composite materials in certain embodiments can be formed using the polymeric sheets discussed above, attached to a composite material formed from a nonwoven substrate, with one or both substrates having nanoparticles attached thereto and deposited into the depth of the substrate or substrates.

First substrate 240 is configured to filter contaminants primarily with fibers 46, although as mentioned previously, first substrate 240 may also include nanoparticles. Second substrate 250 is configured to filter contaminants with both fibers 256 and nanoparticles.

In some embodiments, the substrate may compromise additives, such as antibacterial and/or antiviral compositions such as silver, zinc, copper, organosilicone, tributyl tin, organic compounds that contain chlorine, bromine, or fluorine compounds.

In certain embodiments, the composite material (i.e., the substrate and/or the nanoparticles) may be electrostatically charged such that, for example, contaminants are captured both with mechanical and electrostatic filtration. The bond between the substrate and the nanoparticles may also be enhanced by electrostatically charging the nanoparticles, the substrate or both. For example, in certain embodiments, the substrate is electrostatically charged such that mechanical filtration can be achieved by nanoparticles while electrostatic filtration can be achieved through electret substrate.

The substrate, the nanoparticles, or both can be electrostatically charged using triboelectric methods, corona discharge, electrostatic fiber spinning, hydro charging, charging bars or other known methods. Corona charging is suitable for charging monopolymer fiber or fiber blend, or fabrics. Tribocharging may be suitable for charging fibers with dissimilar electronegativity. Electrostatic fiber spinning combines the charging of the polymer and the spinning of the fibers as a one-step process. One suitable method for triboelectric charging is described in U.S. Pat. No. 9,074,301, the entire disclosure of which is hereby incorporated by reference herein for all purposes.

The nanoparticles can be selected with different triboelectric properties relative to the substrate in order to use a triboelectric effect to enhance particle removal. With this method, the generated nanoparticles are formed in an electrical field and are less subject to contamination by chemicals that may moderate the triboelectric effect.

The composite material may include a binding agent or binding material, such as an adhesive or binder, to facilitate the attachment of the nanoparticles and/or the retention of the nanoparticles in the substrate so that the nanoparticles can adhere to the substrate, or otherwise be retained by the substrate, within the substrate, to form a stable matrix. The binding agent or binding material is preferably present in relatively small amounts to bond the individual nanoparticles to the substrate.

The binding agent may comprise variety of conventional materials, including natural-based materials, such as starch, dextrin, guar gum, or the like, or synthetic resins such as EVA, PVA, PVOH, SBR, polyglycolide and the like. In certain embodiments, solvent-based adhesives are used in which bonding occurs upon solvent evaporation.

In one preferred embodiment, the binding agent or binding material comprises a dextrin. In yet another embodiment, the binding agent comprises a composition of various substances, such as water, 2-hexoxyethanol, isopropanolamine, sodium dodecylbenzene sulfonate, lauramine oxide and ammonium hydroxide. In yet another embodiment, the binding agent comprises at least a PVOH. Binding agents could be in solution, emulsion, suspension, hot melt, curable, neat, and/or a combination.

In some embodiments, an adhesive resin is used and the adhesive resin may undergo cross-linking after the coating of the adhesive on the substrate. Adhesion (water/solvent resistance) may be promoted by self-crosslinking as the solvent in the adhesive formulation evaporates or by heat activation during drying process. In the case of certain adhesives, crosslinking can be accomplished through high energy wavelengths of electromagnetic radiation including, but not limited to RF, UV, or e-beam. The amount of adhesive can be controlled by adjusting the nozzle size of spray coater 140 or controlling the flow rate of the adhesive composition. The binding agent can be applied using spray nozzles, dip coating or other methods.

In some embodiments, the binding agent or binding material may include a surfactant to lower the surface or interfacial tension of the binding agent, thereby increasing its dispersion and wetting properties and allowing the binding agent to more easily penetrate into the depth of the substrate. Suitable surfactants for use with the adhesives disclosed herein include nonionic, anionic, cationic and amphoteric surfactants, such as sodium stearate, 4-(5-dodecyl)benzenesulfonate, sodium dodecylbenzene sulfonate wetting agents, docusate (dioctyl sodium sulfosuccinate), alkyl ether phosphates, benzalkonium chloride (BAC), perfluorooctanesulfonate (PFOS) and the like.

In some embodiments, the substrate includes its own binder composition. In these embodiments, the binding agent or binding material may, or may not, be added to the substrate. In one such embodiment, the substrate comprises biocomponent fibers, wherein one of the components comprises an outer sheath at least partially surrounding an inner core, as discussed further below.

Figure 22B:
FIG. 22B is a photograph of a nonwoven material with a binding agent.
Figure 22A:
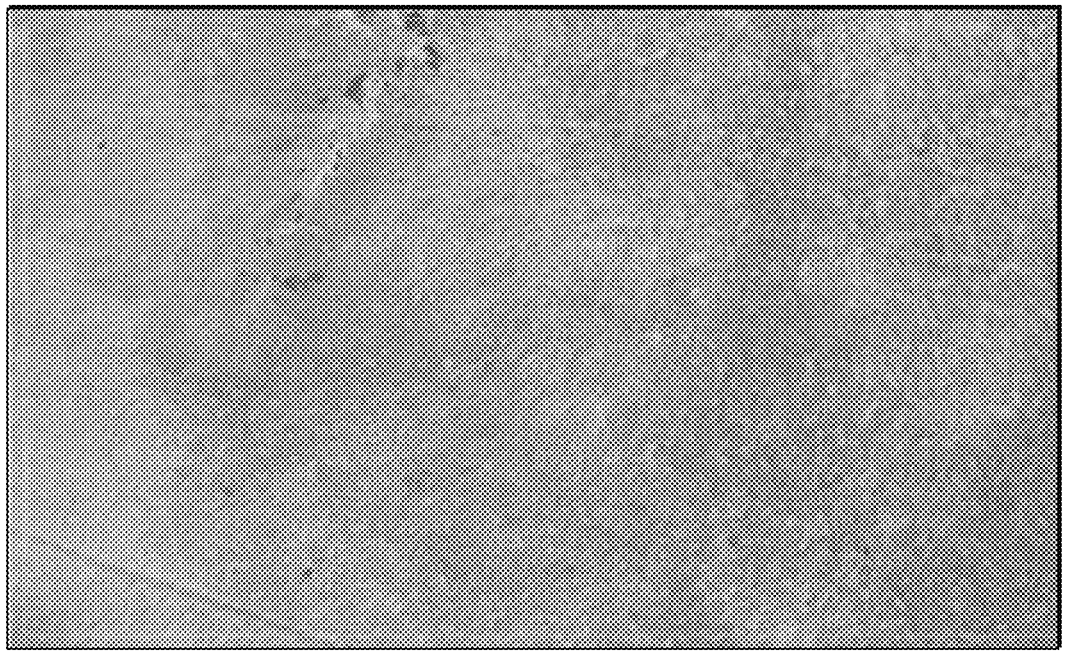
FIG. 22A is a photograph of a nonwoven material without using a binding agent.

FIG. 22A is a magnified image of a composite product having nanoparticles deposited therein without the use of a binder material. FIG. 22B is a magnified image of a composite product wherein a binder material of dextrin and water was used to adhere the nanoparticles to the fibers. As shown, the nanoparticles adhere more uniformly to the substrate with the use of a binding agent.

FIG. 22A shows the substrate with biosoluble glass nanofiber deposited in a layer on only a surface of the substrate and relying on electrostatic forces to retain the nanofiber. Clumping of the nanofiber and poor retention of the nanofiber can be seen in FIG. 22A. The substrate can be a polymeric sheet, knit, weave, mesh, or nonwoven material.

Composite materials having one or more polymer sheets as a substrate can include a binder material used to retain the nanoparticles using the materials discussed above, in further embodiments.

In further examples, any of the binder materials disclosed herein can be used. Furthermore, nanoparticles of biosoluble glass have been deposited into the depth of the substrate. In this example, the substrate itself has a MERV rating of 4 to 10, which can be accomplished using any of the methods described herein. With the nanoparticle deposited into the depth of the substrate and having an electrostatic charge, a substrate originally having a MERV of 8 has been used to produce a composite product having a MERV of 13 in one example. In another example, a substrate originally having a MERV of 6 has been used to produce a composite product having a MERV of 15. The substrate is provided on a roll and, in a roll to roll continuous process, such as any of the processes and methods described herein, the composite product can be produced on a commercial scale. In an example, a roll to roll process operated at 30 feet per minute.

In certain embodiments, the composite materials discussed herein may be included as part of a filter device that traps or absorbs contaminants, such as a liquid filter, a gas filter for home and commercial air filtration, a surgical mask or other face covering or the like. The filter device may be a mechanical filter, absorption filter, sequestration filter, ion exchange filter, reverse osmosis filter, surface filter, depth filter or the like, and may be designed to remove many different types of contaminants from air, water, or others.

In one such embodiment, the composite materials are incorporated into an air filter that removes particles and contaminants from the air, such as a HEPA filter (i.e., pleated mechanical air filter), a UV light filter, an electrostatic filter, a washable filter, a media filter, a spun glass filter, pleated or unpleated air filters, active carbon filters, pocket filters, V-bank compact filters, filter sheets, flat cell filters, filter cartridges and the like. The composite materials may comprise a filter media for the air filter and may be supported by a support layer, a scrim layer, or may be included in other layers or materials. Applicant has discovered that incorporating nanoparticles in depth into composite materials as discussed herein substantially increases the efficiency of the air filter without compromising other factors, such as pressure drop (i.e., air flow) through the filter. In addition, these materials increase the overall dust holding capacity and thus the life of the filter, particularly compared to filters that rely solely or primarily on electrostatic effects to increase efficiency.

Conventional home and commercial air filters are typically rated by the filter's ability to capture particles between about 0.3 and 10 microns. This rating, referred to as a Minimum Efficiency Reporting Value or MERV is developed by the American Society of Heating, Refrigerating and Air Conditioning Engineers (ASHRAE). The MERV ratings range from 1-16, with higher values indicating higher efficiencies at trapping specific types of particles. Conventional mechanical air filters typically report MERV ratings for filtration materials of about 8.

Air filters are typically rated based on their initial efficiency (i.e., the efficiency of the air filter prior to use) and their efficiency over time and use. This latter efficiency is typically tested through a conditioning step, referred to as ASHRAE Standard 52.2 Appendix J.

The air filters provided herein have an initial MERV rating greater than about 10 and a pressure drop less than about 0.5 inches of water. In some cases, the initial MERV rating is about 11 and the pressure drop is equal to or less than about 0.17 inches of water, or about 13 and the pressure drop is equal to or less than about 0.36 inches of water, or about 14 and the pressure drop is equal to or less than about 0.5 inches of water.

The gas filters provided herein have a MERV rating of 10 or greater after the gas filter has been conditioned with ASHRAE Standard 52.2 Appendix J. In some embodiments, the MERV rating is 13 or greater after the gas filter has been conditioned with ASHRAE Standard 52.2, ISO Standard 16890 or any other acceptable standard in the industry.

The MERV rating of the filter media discussed herein will vary based on many factors, including the types and sizes of fibers used in the filter media, the density of individual nanoparticles within the filter media, the width of the filter media, the number and size of pleats (if any) and the like. The MERV rating can be measured for a sheet of the composite product, as well as the composite product formed as a pleated filter media, and the pressure drop for each can vary. Likewise, the pressure drop across the filter media will also depend on many factors, including those mentioned above.

One factor that impacts both MERV rating and pressure drop is the density or add-on amount of the nanoparticles within the substrate relative to the density of the fibers within the substrate. In certain embodiments, the filter media described herein have a nanoparticle area density of about 0.1 grams/m$^2$ to about 20 grams/m$^2$, preferably at least about 2 grams/m$^2$.

The efficiency or MERV rating of the filter may increase with higher add-on amounts of nanoparticles. In particular, Applicant has discovered that, for example, with add-on amounts of at least 2 g/m$^2$, a filter having a MERV rating of about 10 may be achieved. Add-on amounts of 4 or 6 g/m$^2$ provide a filter with a MERV rating of about 12 and 13, respectively. Add-on amounts of 10 g/m$^2$ or higher result in a filter with a MERV rating of 15 or higher.

Figure 5:
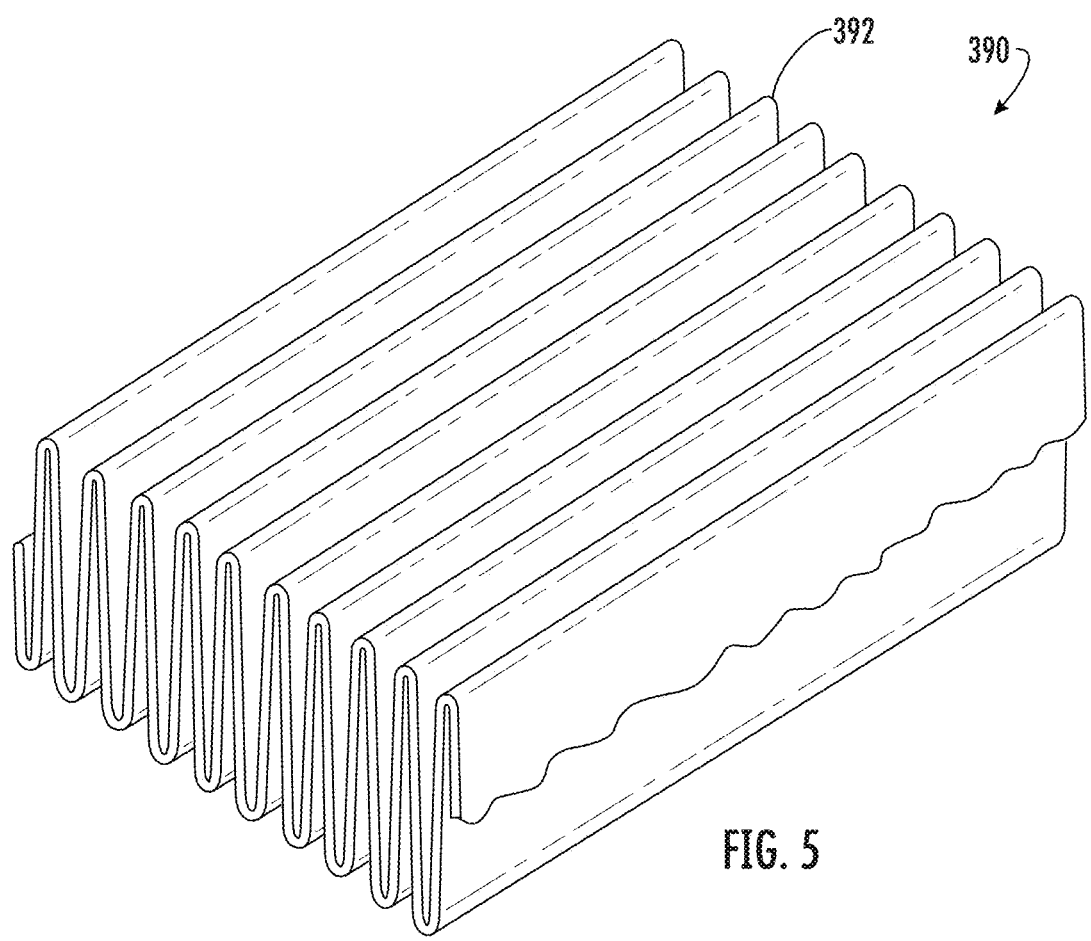
FIG. 5 illustrates a pleated nonwoven filter media.
Figure 6:
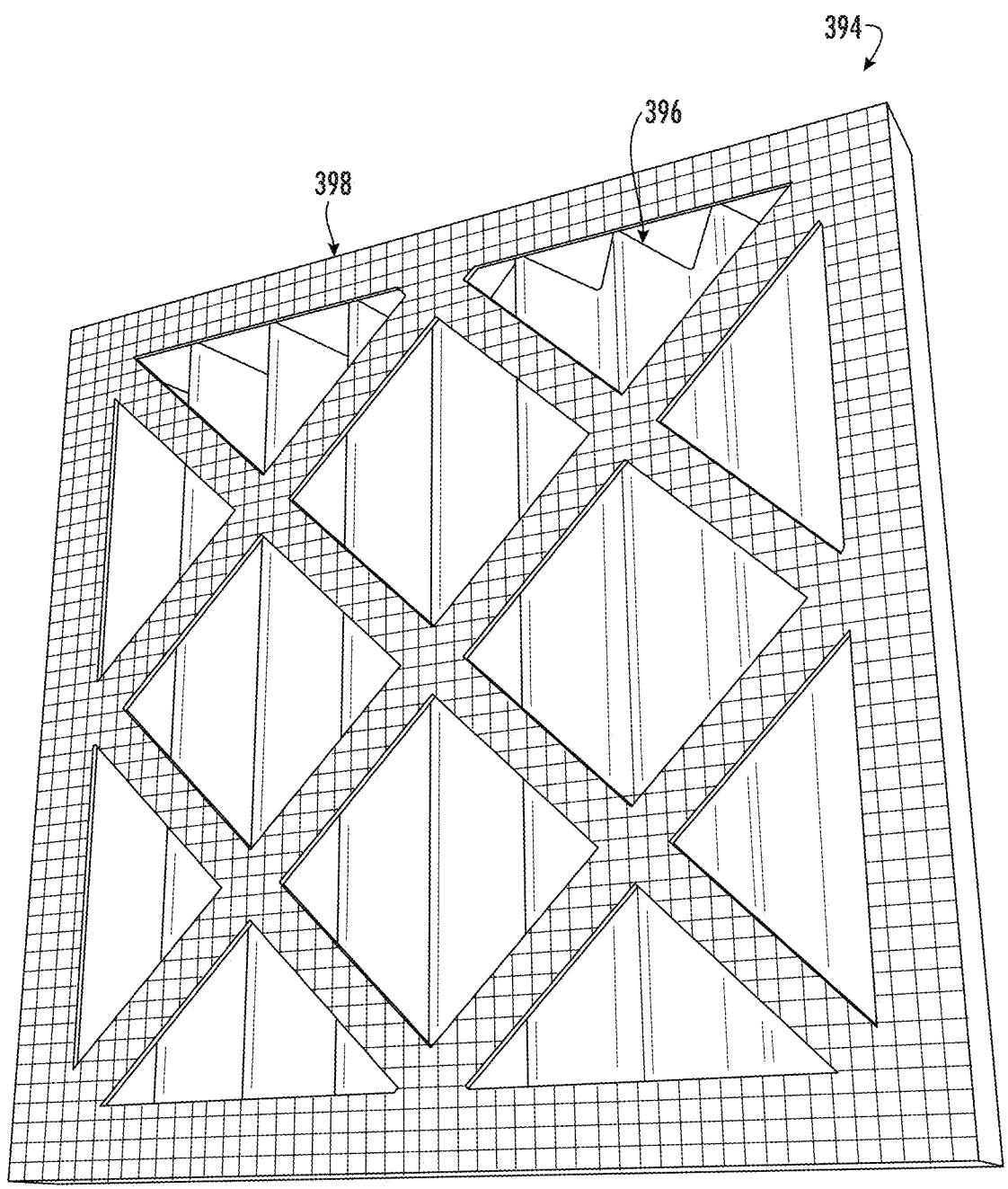
FIG. 6 illustrates a representative air filter.

An example of a pleated filter medium 390 is shown in FIG. 5. Filter 390 may include about 0 to 10 pleats/inch, depending on the application. The filter medium can be mounted in a cardboard or metal frame and used as an easily replaceable filter product. (FIG. 6). As shown, a gas filter 394 produced with the composite material described herein comprises a pleated filter media 396 and a support layer 398 that provides rigidity and structure to filter media 396.

Figure 7:
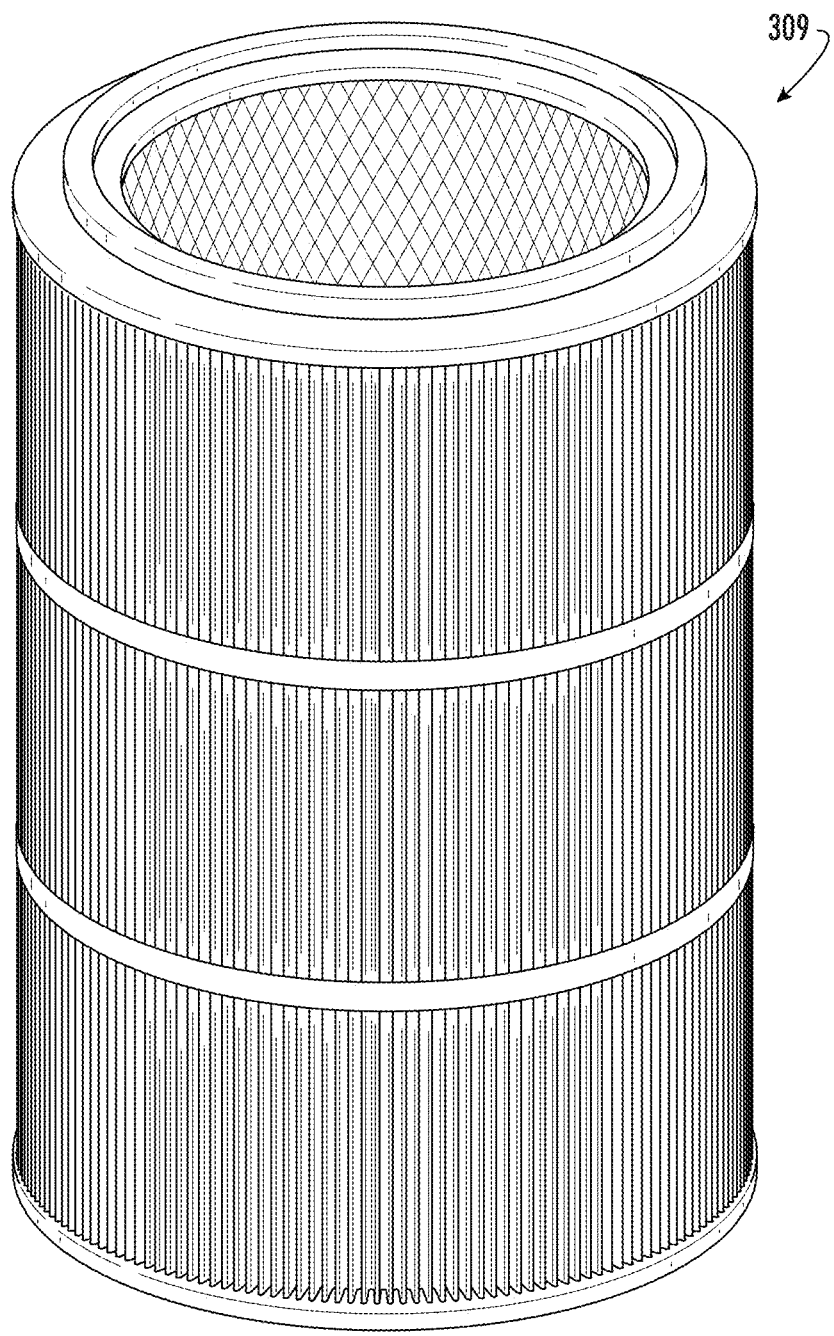
FIG. 7 illustrates a gas filter.

FIG. 7 illustrates a gas filter 309 produced with the composite material described herein. Gas filter 309 includes a substrate and nanoparticles dispersed through the depth of the substrate. The substrate is then rolled into a cylinder, cone or other suitable shape and may be used in applications, such as gas turbine and compressor air intake filters, panel filters and the like.

Other types of filters that may be developed with the composite material disclosed herein include conical filter cartridges, square end cap filter cartridges, pocket filters, V-bank compact filters, panel filters, flat cell filters, pleated or unpleated bag cartridge filters and the like.

The composite products disclosed herein may be used in medical masks or other medical applications, such as cartridges in respirators. Medical masks are designed to protect healthcare personnel and/or patients from microbials and other materials. For example, medical masks can block bacteria, which can have a dimension of about 3 microns, for example, as well as viruses, which can have a dimension of about 0.1 microns, for example. The masks are made using composite materials in multiple layers, and have ear loops, ties, or other structures for attaching the mask to a person's face. Some of the layers can include composite materials having nonwoven substrates, polymeric sheets or layers, etc. A wire may be incorporated into at least an upper portion of the mask so that at least that portion conforms to the person's face. The mask can include rigid polymeric structures designed to hold the multilayer composite materials in front of a person's face. In one example, the mask has three layers. The outer layer and inner layer comprise a nonwoven material such as spunbond polypropylene that provides breathability, although any of the materials mentioned herein can be used. The middle layer is disposed between the inner layer and outer layer and comprises a polymeric apertured sheet substrate having nanoparticles deposited into the depth of the substrate to provide an initial MERV of greater than 8, preferably a MERV greater than 10, and more preferably a MERV of 13 or more. The pressure drop through the mask is 3 to 6 mm of water, more preferably 4 mm of water for breathability. It is desirable for the mask to have an efficiency of about 95%. Other examples of masks have four or more layers. Multiple layers of the composite products can be combined in a single mask.

FIG. 8 schematically depicts an overall system 410 for manufacturing the composite materials and other products described above. As shown, system 410 comprises a feeder 420 for advancing a substrate 430 such as a polymer sheet or other material through the manufacturing process. System 400 further includes a coater 440, a fiberization system 450 and a heating and/or drying device 460. In certain embodiments, system 400 further includes a vacuum or other source of negative pressure 470 underlying substrate 430 opposite fiberization system 450.

In one embodiment, feeder 420 comprises a winder 424 on the downstream end of the process and an unwinder 422 on the upstream end that continuously winds substrate 430 through system 400. In certain embodiments, feeder 420 may further comprise a support surface (not shown) extending between the winders for supporting substrate 430 as it moves downstream through system 400. In other embodiments, substrate unwinds directly from unwinder 422 to winder 424 without another support surface.

Coater 440 is configured to spray droplets of a binding agent or binding material, such as an adhesive or other binder, onto substrate 430 so that the nanoparticles can adhere to the substrate 430 to form a stable matrix. The binding agent is preferably present in relatively small amounts to bind the individual nanoparticles to fibers throughout substrate 430. In a preferred embodiment, coater 440 comprises a spray nozzle sized to generate adhesive droplets having a diameter of about 20 to 30 microns to increase the penetration depth of the adhesive through substrate 430. Of course, the droplet size may be affected by numerous other parameters, including air pressure, volume of air, temperature of air, humidity, spray horn design, rheology/viscosity of the adhesive, the carrier and the like.

Of course, it will be recognized that coating the substrate with a binding agent or binding material may be achieved with other coating methods, which include ultrasonic spraying, dip coating, spin coating, gravure coating, kiss roll coating, screen coating, powder coating, electrostatic, sputter coating, or similar coating techniques.

As discussed above, the binding agent may comprise variety of conventional materials, including natural-based materials, such as starch, dextrin, guar gum, or the like, or synthetic resins such as EVA, PVA, PVOH, SBR and the like. In certain embodiments, solvent-based adhesives are used in which bonding occurs upon solvent evaporation.

In one preferred embodiment, the binding agent comprises a dextrin. In another embodiment, the binding agent comprises a composition of various substances, such as water, 2-hexoxyethanol, isopropanol amine, sodium dodecylbenzene sulfonate, lauramine oxide and ammonium hydroxide. In yet another embodiment, the binding agent comprises PVOH. Binding agents could be in solution, emulsion, suspension, hot melt, curable, neat, and/or a combination.

In some embodiments, an adhesive resin is used and the adhesive resin may undergo cross-linking after the coating of the adhesive on substrate 430. Adhesion (water/solvent resistance) may be promoted by self-crosslinking as the solvent in the adhesive formulation evaporates or by heat activation during drying process. In the case of certain adhesives, crosslinking can be accomplished through high energy wavelengths of electromagnetic radiation including, but not limited to RF, UV, or e-beam. The amount of adhesive can be controlled by adjusting the nozzle size of spray coater 440 or controlling the flow rate of the adhesive composition.

In some embodiments, the binding agent may include a surfactant to lower the surface or interfacial tension of the binding agent, thereby increasing its dispersion and wetting properties and allowing the binding agent to more easily penetrate into the depth of the substrate. Suitable surfactants for use with the binding agents disclosed herein include nonionic, anionic, cationic and amphoteric surfactants, such as sodium stearate, 4-(5-dodecyl)benzenesulfonate, sodium dodecylbenzene sulfonate wetting agents, docusate (dioctyl sodium sulfosuccinate), alkyl ether phosphates, benzalkonium chloride (BAC), perfluorooctanesulfonate (PFOS) and the like.

In some embodiments, spray coater 440 is located upstream of fiberization system 450 so that the binding agent is sprayed before the nanoparticles are deposited. In other embodiments, spray coater 440 is located downstream of fiberization system 450 so that the binding agent can be sprayed after nanoparticle deposition. In other embodiments, systems 400 includes two spray coatings; one located upstream from fiberization system 450 and a second spray coater (not shown) located downstream of fiberization system 450 to coat substrate 430 with a secondary binding agent after deposition of the nanoparticles.

In some embodiments, there is more than one nozzle head with each spray coater 440. The nozzle heads may, for example, be disposed in series for better uniformity or to increase fiber spraying width. Alternatively, the nozzle heads may be located in parallel, i.e., across the width of the substrate, to ensure that the binding agent is coated throughout the width of the substrate. In some embodiments, the substrate includes its own binder composition. In these embodiments, the binding agent may, or may not, be added to the substrate. The binder material incorporated into the substrate material may be used in conjunction with other binder materials that are sprayed onto the substrate.

In a preferred embodiment, a source of negative pressure or a vacuum is disposed under the substrate opposite spray coater 440 to increase the penetration depth and uniformity of the binding agent. The source of negative pressure may be any suitable suction device that draws binding agents through substrate, such as a suction pump or the like.

The substrate may comprise a material that bonds to the nanoparticles. For example, the substrate may comprise a material that becomes tacky and/or fluid upon heating and/or drying. During the heating/drying step, the substrate is heated up to its melting point until it becomes tacky and/or fluid to bond the nanoparticles to the substrate. In a preferred embodiment, bonding and drying take place at the same time within drying device 460.

Figure 10A:
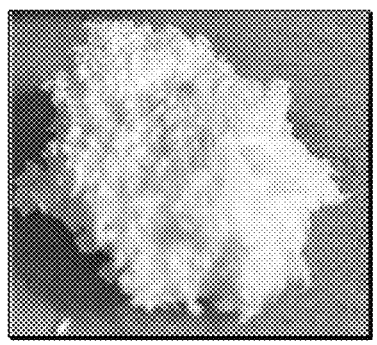
FIGS. 10A-10C are photographs of macro clusters of nanofibers, smaller clusters of nanofibers and individualized nanoparticles, respectively.
Figure 10B:
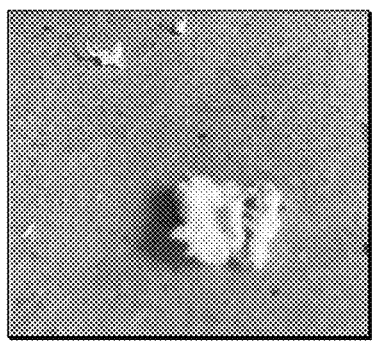
Figure 10C:
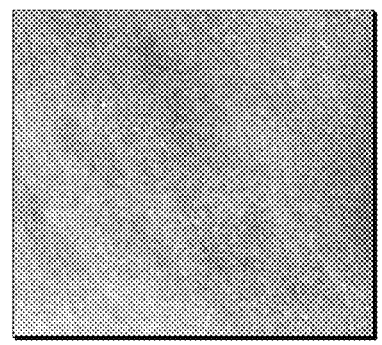

FIG. 9 schematically depicts a fiberization system 450 for converting clumps or clusters of nanofibers into individual nanoparticles. The term "fiberization" as used herein means converting (e.g., opening up, separating, isolating and/or individualizing) clusters, clumps or other groups of nanoparticles that may, or may not, be entangled with each other into individual nanoparticles having at least one dimension less than 1 micron. FIGS. 10A-10C illustrate examples of macro clusters of entangled nanofibers (FIG. 10A), smaller clusters of entangled nanofibers (FIG. 10B) and individual nanoparticles (FIG. 10C).

As shown, fiberization system 450 includes a feeder 500, such a hopper, for introducing the larger or macro clusters/clumps of nanoparticles (see FIG. 10A) into system 450 Feeder 500 may comprise any suitable hopper device known by those skilled in the art and preferably is configured to introduce macro clusters of particles into the process at a specified rate, which will depend on the rate of fiberization downstream. The nanoparticles may be introduced continuously at a specified rate, or an intervals at a specific rate. The macro clusters of nanoparticles in bundles may be broken apart prior to introducing them into feeder 500.

It should be recognized that the nanoparticles may be introduced into fiberization device 450 in many different forms. For example, raw nanofibers may be produced as long separated fibers. In this form, the nanofibers may be cut to obtain the desired length to diameter ratio.

System 450 further includes a separator 510, such as a blender or the like, for separating or breaking down the macro clusters/clumps of nanoparticles into smaller clusters/clumps of nanoparticles (see FIG. 10B). Feeder 500 transfers nanofibers into separator 510 by any mechanical means in a steady continuous state. The speed of transfer will depend on a variety of factors, such as the velocity of substrate 430 along feeder 420, the rate of fiberization of the nanoparticles and the like. With the help of controlling the amount of nanoparticles dropping into separator 510, the amount of nanoparticles dispersed into the substrate can be controlled to create a continuous manufacturing process.

In one embodiment, separator 510 includes a housing 512 with a first opening 514 coupled to feeder 500 and a second opening 516 coupled to the downstream process. The second opening 516 is preferably sized to only allow clusters of nanofibers having a certain size to pass therethrough. Separator 510 may include a plurality of rotatable blades (not shown) designed to rotate around a vertical axis within housing 512 to separate and open the coarse clusters of nanofibers. The blades may have the same, or different, pitches and cambers to allow for sequential breaking down or "opening" of the entangled fibers as they pass from first opening 514 to second opening 516.

Fiberization system 450 further includes a stream of gas that extends throughout the system from separator 510 to a nozzle 520 (discussed in more detail below). The stream of gas (along with a series of pumps as discussed below) provides the motive force to move the nanofibers through system 450. In one embodiment, the stream of gas is created with an air compressor 530 configured to supply compressed air to the system, although it will be recognized that other forms of gas may be used to transfer the nanofibers through system 450.

System 450 comprises one or more pumps for moving the clusters of nanofibers and eventually the individual nanoparticles throughout the system. Pumps may comprise any suitable pump, such as positive-displacement, centrifugal, axial-flow and the like. In one embodiment, a first pump 540 includes a first inlet fluidly coupled to air compressor 530 by a first passage 542 and a second inlet fluid coupled to separator 510 by a second passage 544. Compressed air is drawn into first pump 540, which creates a negative pressure (e.g., a vacuum) to draw clusters of nanofibers from separator 510 into pump (discussed in more detail below). System 550 may further include second and third pumps 550, 560 each fluidly coupled to the outlet of first pump 540. In a similar fashion, second and third pumps 550, 560 create negative pressures that draw the clusters of nanofibers through a third passage 552.

Figure 11:
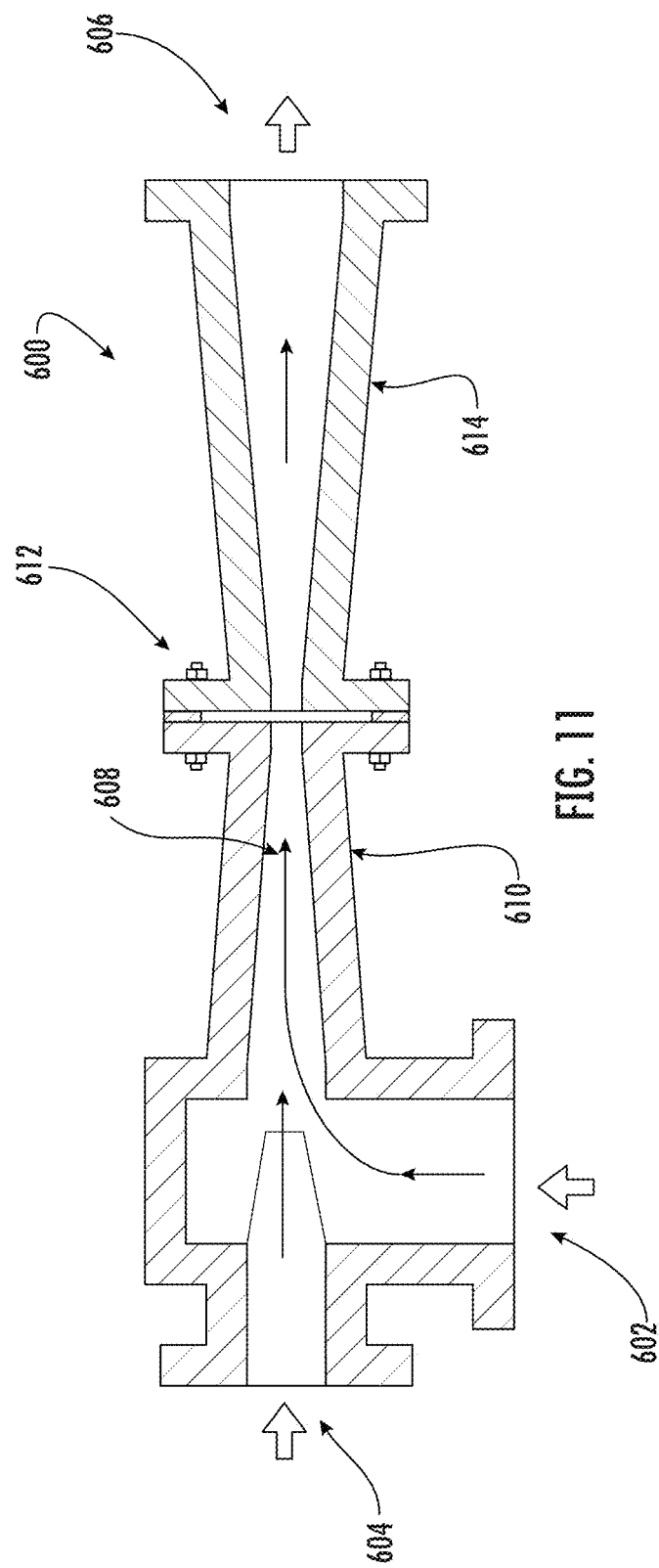
FIG. 11 illustrates an eductor of the system of FIG. 13.
Figure 12:
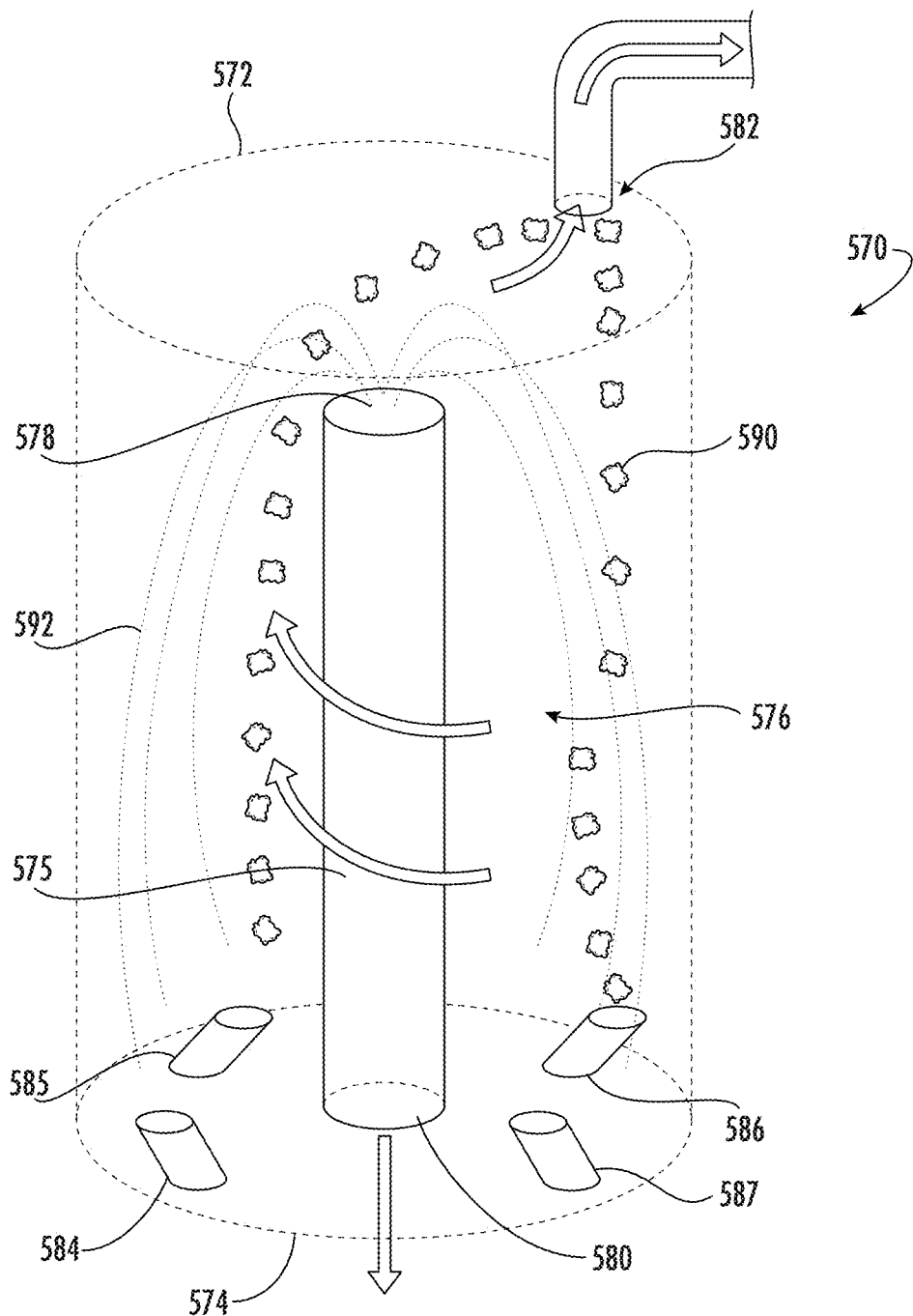
FIG. 12 illustrates a reactor of the system of FIG. 13.

In certain embodiments, pumps 540 comprise eductors 600. As shown in FIG. 11, eductors 600 each comprise a motive fluid inlet 602 and a nanofiber inlet 604 coupled to an outlet 606 via a fluid passage 608. Fluid passage 608 includes a converging inlet nozzle 610, a diffuser throat 612 and a diverging outlet diffuser 614. High-pressure, low-velocity air is converted to low-pressure high-velocity air, thus producing the pressure difference required for suction. Based on the venturi effect and the Bernoulli principle, the primary fluid medium (e.g., compressed air) is used to create a vacuum to draw the nanofibers into the eductor 600 and to expel them through outlet 606. The diameter of the eductor 600 depends on the volumetric flow rate of the compressed air, the suction requirement, the pressure drop, and the fluid pressure of the compressed air.

Referring back to FIG. 9, third passage 552 includes a junction 554 that splits third passage 552 into two separate passages, each leading to second and third pumps 550, 560. Junction 554 preferably includes a surface or wall that is disposed substantially perpendicular to third passage 552 to form a T-shaped intersection. As the clusters of nanofibers move through third passage 552, they are propelled against this surface or wall by the negative pressure applied by second and third pumps 550, 560. This velocity of the nanofibers against junction 554 creates a collision with sufficient kinetic energy to cause at least some of the clusters of nanofibers to break up into smaller clusters of nanofibers and/or into individual nanoparticles having at least one dimension less than 1 micron.

In order to create the necessary kinetic energy to break down the clusters of nanofibers, the air is propelled throughout system 450 at a velocity of about 500 feet/minute (fpm) to about 10,000 feet/minute, preferably about 2,000 fpm to about 6,000 fpm. The system 450 includes a sufficient amount of suction pressure, preferably at least about 20 psi. This suction pressure creates an overall pressure throughout the system of at least about 100 psi.

In certain embodiments, system 450 further includes fourth and fifth fluid passages 562, 564 that couple the outlets of second and third pumps 550, 560 with a reactor 570. As shown in FIG. 12, reactor 570 comprises a top surface 572, a bottom surface 574 and an internal annular chamber 576 extending from top surface 572 to bottom surface 574. Reactor 570 further includes a central tube 575 having an open upper inlet 578 and an outlet 580. Reactor 570 may further include one or more upper outlet(s) 582. Reactor 570 may be coupled to a source of energy (not shown) that is configured to create a vortex of swirling gas within annular chamber 576. The source of energy may comprise any suitable energy source, such as a pump, compressor, generator and the like. The swirling gas preferably flows around central tube 575 from the bottom of reactor 570 to the top to move the clusters of nanofibers and the individual nanoparticles upwards from bottom surface 575 towards top surface 572.

In another embodiment, the vortex is created without a separate source of energy. In this embodiment, the clusters of nanofibers 590 and individual nanoparticles 592 enter the reactor 570 through bottom inlets 584, 585, 586, 587. Inlets 584, 585, 586, 587 are angled upwards to facilitate movement of the nanofibers and nanoparticles around central tube 575. In a preferred embodiment, at least one or more of the inlets 584, 585, 586, 587 is angled such that the nanofibers and nanoparticles enter the reactor 570 such that they are substantially tangential to central tube 575. Once they have entered annular chamber 576, the velocity vector (speed and direction) of the nanofibers and nanoparticles creates a vortex within reactor 570 that causes them to swirl around central tube 575 and upwards to the upper portion of chamber 576. The swirling gas preferably flows around central tube 575 from the bottom of reactor 570 to the top to move the clusters of nanofibers and the individual nanoparticles upwards from bottom surface 575 towards top surface 572. Without any interruption, the nanofibers 590 and nanoparticles 592 are blown from bottom of the reactor to the top. The vortex within chamber 576 may further break down (e.g., open up, separate and/or individualize) the clusters of nanofibers 590 as they pass through reactor 570.

In some embodiments, reactor 570 may also be coupled to a source of energy (not shown) that is configured to create the vortex of swirling gas within annular chamber 576. The source of energy may comprise any suitable energy source, such as a pump, compressor, generator and the like.

The system 410 may further include another pump or source of negative pressure (see, for example, FIG. 13) coupled to upper outlet 582. This negative pressure draws fibers through outlet 582 such that the fibers 590 exit the reactor 570. Since the individual nanoparticles 592 are significantly lighter than the entangled nanofibers 590 that are still clustered together, these individual nanoparticles 592 are drawn into upper inlet 578 of central tube 575. Meanwhile, the larger and heavier clusters of nanofibers 590 that have not yet been broken down are drawn through upper outlet 584. Upper outlet 584 may be coupled to other pumps (not shown), or to first pump 540. In this manner, the clusters of nanofibers 590 are sent through the process again to become further broken down, creating a refeed system to further break down the remaining clusters of nanofibers.

Outlet 580 of central tube 575 is coupled to nozzle 220 (see FIG. 9). The individual nanoparticles are drawn into nozzle 520, where they are dispersed onto a surface of the substrate or into a fiber stream (discussed below). Nozzle 520 may comprise any suitable nozzle known by those in the art. In one embodiment, nozzle 520 has a plurality of outlets having an outer dimension tailored for the size (i.e., area) of the substrate passing below nozzle 520. The nozzle 520 will disperse the nanoparticles onto the substrate at a rate that is driven by the pressure throughout the system.

In certain embodiments, system 400 comprises more than one nozzle coupled to the outlet 580 of reactor 570. The nozzles may be arranged in any suitable form over the substrate, e.g., side-by side, in series, in parallel, or the like.

It will be recognized that pump 540, or pumps 550, 560 may directly feed the nanofiber/air mixture stream into the nozzle 520 (i.e., bypassing reactor 570). In this embodiment, the pressure within system is designed to create sufficient kinetic energy to break down or open up substantially all of the nanofibers into individual nanoparticles such that reactor 570 is not required to separate the nanoparticles from the larger clusters of fibers.

Figure 13:
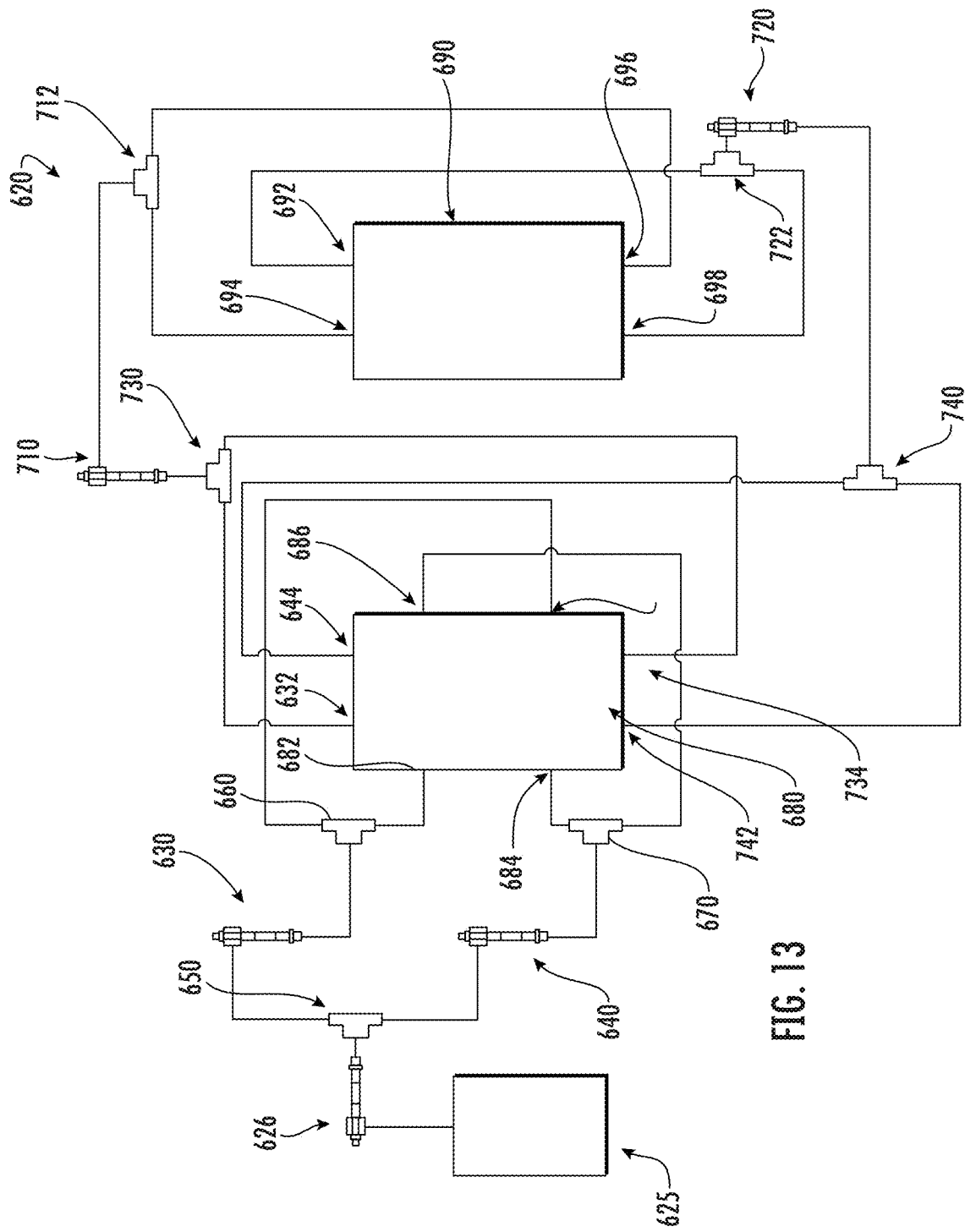
FIG. 13 illustrates another embodiment of a system for converting clusters of nanofibers into individual nanoparticles.

Referring now to FIG. 13, another embodiment of a fiberization system 620 will now be described. As shown, fiberization system 620 includes a separator 625 for separating larger or macro clusters of nanofibers into the smaller clusters of nanofibers that will pass through system 3620. A first eductor 626 is coupled to an outlet of separator 625 and serves to draw the nanofibers from separator 625 and into system 620. An air compressor (not shown) is also coupled to eductor 626 to provide the motive fluid, as discussed above.

Similar to the previous embodiment, second and third eductors 630, 640 are coupled to an outlet of the first eductor 626. The nanofibers are drawn through first eductor 320 and propelled against a surface of a T-shaped intersection 650 to break down at least some of the nanofibers into smaller clusters or individual nanoparticles.

Each of the second and third eductors 630, 640 have outlets coupled to additional T-shaped intersections 660, 670. As before, nanofibers are propelled against the surface of the T-shaped intersection 660, 670 to further break them down. The T-shaped intersections 660, 670 are each coupled to two fluid passages that enter the bottom portion 680 of a reactor. Thus, bottom portion 680 of reactor has four separate inlets 682, 684, 686, 688 for passage of the nanofibers. Each of these inlets is preferably angled upwards and positioned in opposite corners of the reactor. This allows the nanofibers to enter into the vortex of the reactor and then swirl upwards to an upper portion 690 of the reactor.

As discussed previously in reference to FIG. 12, the reactor includes an annular chamber with a central tube having an open upper end and a lower end coupled to a nozzle. The nanofibers that have been sufficiently broken down into individual nanoparticles flow through this open upper end and into the central tube for dispersion through the nozzle. The heavier clusters of nanoparticles that have not yet been broken down exit the reactor through one of four separate outlets 692, 694, 696, 698. Eductors 710, 720 provide the motive force for drawing the nanofibers from reactor 400, as discussed above. Outlets 792, 794 are each coupled to eductor 710 via a T-shaped intersection 712 and outlets 396, 398 are each coupled to eductor 720 via a T-shaped intersection 722. In this case, the nanofibers flow from two passages into one passage as they pass through intersections 712, 722.

Eductors 710, 720 are each coupled to T-shaped intersections 730, 740. As described before, the nanofibers are propelled into T-shaped intersections 730, 740 to further break them down into individual nanoparticles. T-shaped intersections 730, 740 are then each coupled to the bottom portion 780 of reactor 700 (via inlets 732, 734, 742, 744). This allows the nanofibers to pass back into reactor 700 for further processing. This process continues for each cluster of nanofibers until it has been entirely broken down into nanoparticles and passed through the central tube into the nozzle. As a last step, individualized nanofibers are air sprayed from the nozzle onto any substrate or mixed with any fiber spinning stream. During this process, suction is up to 20 psi, pressure is up to 100 psi.

In certain embodiments, fiberization system may include a separate control system that monitors the nanofibers to determine when they have been broken down into individual nanoparticles suitable for passing through nozzle. The control system may, for example, simple monitor the pressure throughout the system to ensure that sufficient pressure is being applied to the nanofibers to break them down into nanoparticles. Alternatively, this control system may comprise a variety of different sensors disposed through the system to detect characteristics of the nanoparticles, such as weight or size. The sensors may be disposed, for example within reactor 700 such that the control system may control various parameters of reactor 700, such as the negative pressure applied to outlets, 692, 694, 696, 698, the speed of the vortex passing around the annular chamber, or the pressure applied to central tube that draws then nanoparticles into the nozzle.

Figure 14:
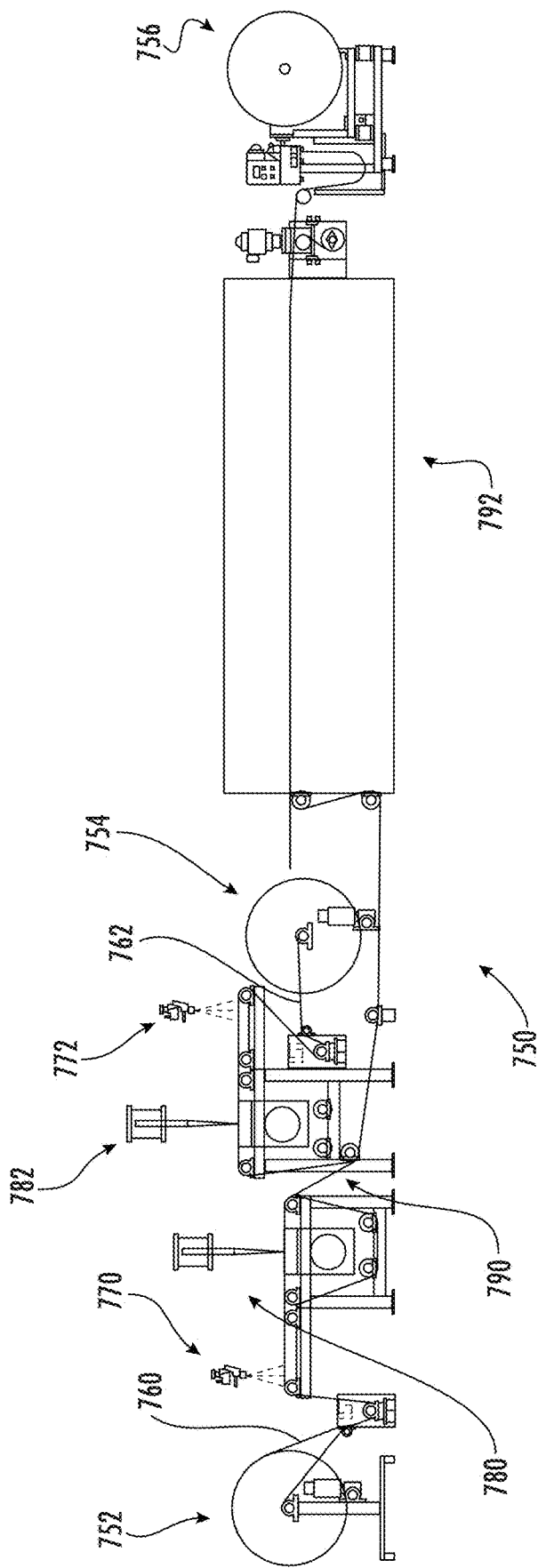
FIG. 14 illustrates a system for manufacturing a dual-layer nonwoven material.

FIG. 14 illustrates another embodiment of a system 750 for manufacturing multiple layers of composite material. As shown, system 750 comprises first and second unwinders 752, 754 and a single winder 756 for winding first and second substrates 760, 762 downstream through system 750. As in previous embodiments, system 750 may further comprise a support surface (not shown) for each of the substrates 760, 762. First and second unwinders 752, 754 serve to advance the first and second substrates 760, 762 into the process, where they are joined together and then wound towards a single winder 756, as discussed below. The substrates can include nonwoven materials, mesh, knit, weaves, polymeric sheets, as mentioned above.

System 750 includes first and second spray coaters 770, 772, each positioned downstream of first and second unwinders 752, 754 for applying binding agents to the first and second substrates 760, 512. System 700 further includes first and second fiberization systems/devices 780, 782 positioned downstream of each of the spray guns 770, 772. As discussed previously, fiberization devices 780, 782 generate individual nanoparticles and disperse those nanoparticles onto substrates 760, 762.

Once the nanoparticles have been dispersed into substrates 760, 762, the two substrates are joined together at a junction point 790 such that they are advanced downstream together. The two substrates may be bonded to each other at this point, or they may simply be laid one on top of the other.

The system 750 further includes a heater/drying device, such as an IR oven 792, downstream of the junction point 790 of the two substrates. The heating/drying device heats and dries the two substrates to bond them to each other and to bond the nanoparticles to the fibers within the substrates. The substrates may, for example, be laminated to each other.

In certain embodiments, nanoparticles are dispersed into both of the substrates 760, 762. In one such embodiment, system 500 is designed such that nanoparticles are dispersed through first surfaces of each of the substrates. The substrates can then be joined such that the first surfaces are facing each other. Alternatively, the first surfaces may be facing away from each other (i.e., joining the substrates at the second, opposing surfaces of each substrate). In yet another embodiment, a first surface of the first substrate is joined to a second surface of the second substrate.

Figure 15:
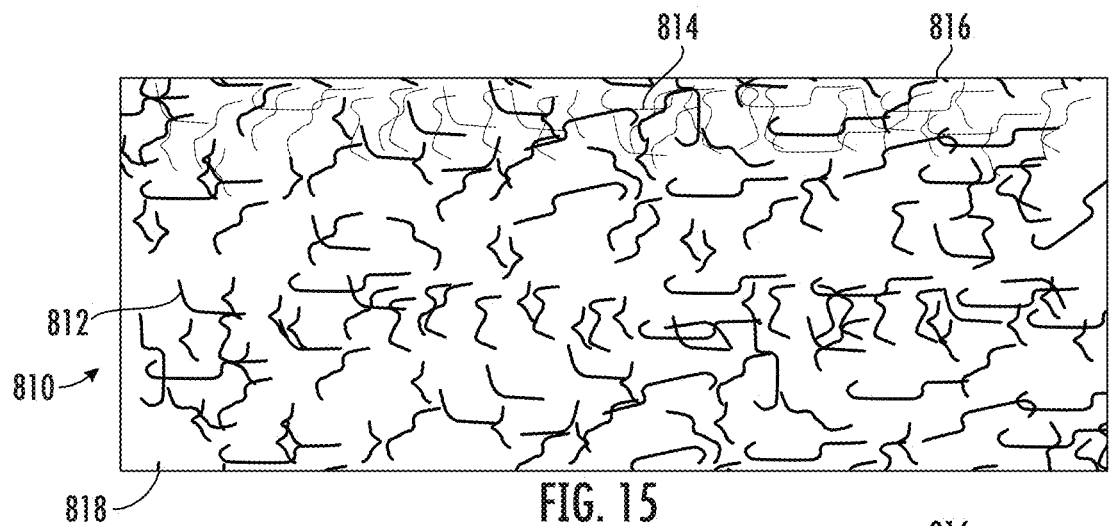
FIG. 15 is a side view of a nonwoven material with nanoparticles dispersed into a portion of the material.
Figure 16:
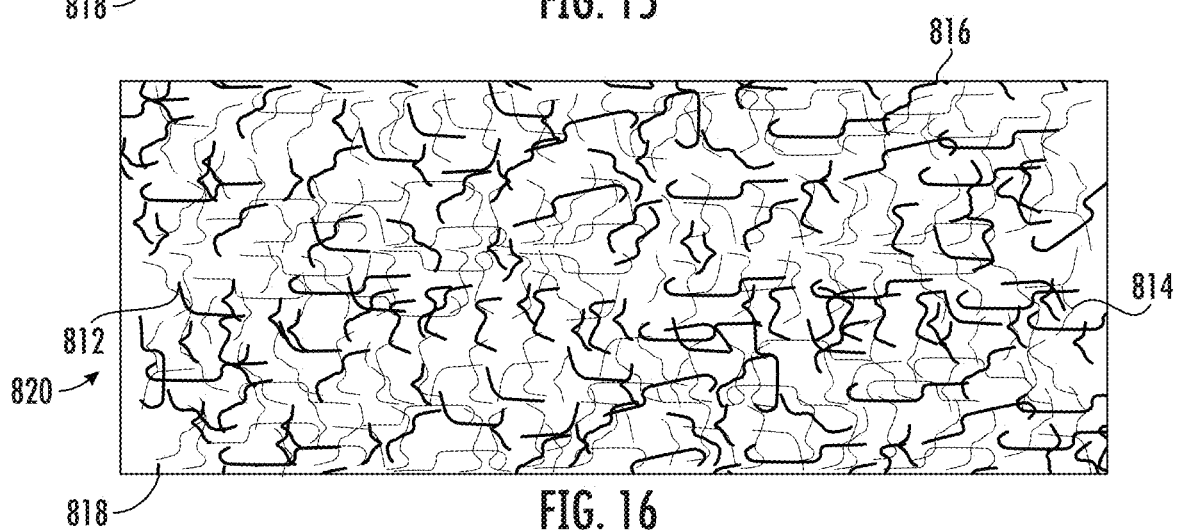
FIG. 16 is a side view of a nonwoven material with nanoparticles dispersed throughout the material.

Other substrates can be used to form the composite material, in further embodiments. FIGS. 15 and 16 show further embodiments of a composite material having nanofiber deposited therein, in which the substrate is a nonwoven material of microfibers. The nanoparticles can be substantially distributed across the thickness of the substrate in certain embodiments. In other embodiments, the composite material can include nanoparticles that have a density gradient across the thickness of the substrate.

Figure 17:
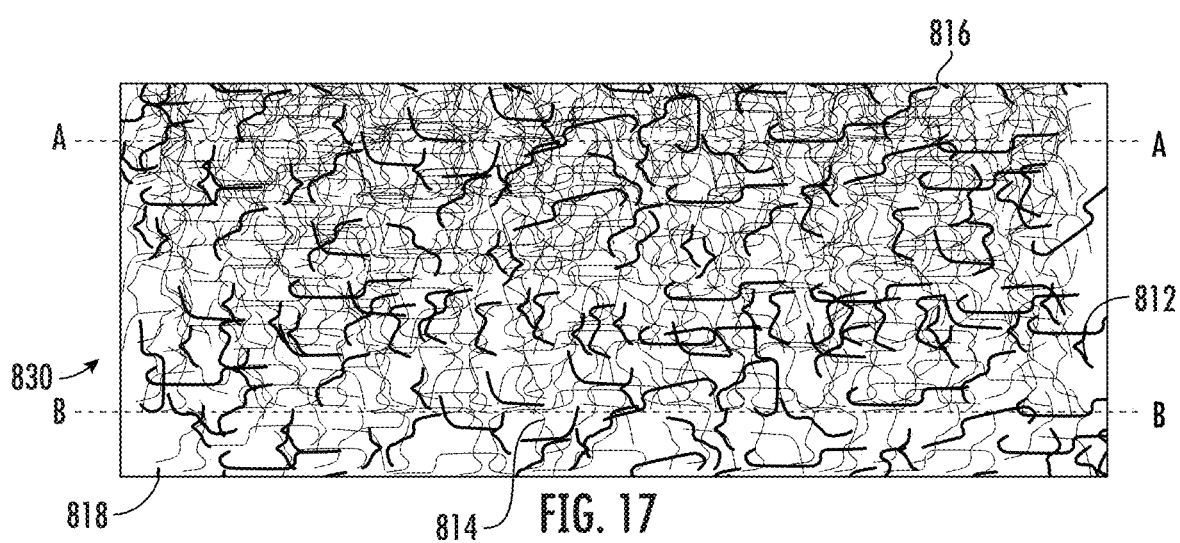
FIG. 17 is a side view of a nonwoven material with nanoparticles dispersed in a gradient through the material.

For example, FIG. 17 illustrates a substrate 830 wherein the nanoparticles 814 form a density gradient with a higher density of nanoparticles 814 disposed near first surface 816 than second surface 818. In certain embodiments, the density of nanoparticles located at first surface 816 differs by greater than about 75% of the density of nanoparticles dispersed at second surface 818. In some embodiments, this difference is greater than 50%. In some embodiments, the difference is greater than 25%. In certain embodiments, the amount or number of individual nanoparticles dispersed at or near second surface 818 is less than about 50% of the amount of individual nanoparticles dispersed at or near first surface 816, preferably less than about 25% and more preferably less than about 10%.

The density gradient shown in FIG. 17 may be substantially linear from first surface 816 to second surface 818. Alternatively, the density of the nanoparticles 814 may reduce from first surface 816 to second surface 18 in a series of discrete steps, or the gradient may be random (i.e., a generally reduction in density that is not linear or stepped). The substrate for the composite material can be a polymeric apertured sheet, weave, knit, mesh, nonwoven, etc.

The distribution of nanoparticles across the thickness of the composite material can be measured, for example, using imaging techniques. A magnified view of the composite product, using an electron microscope or other techniques, taken at a horizontal section of the product at the middle of the thickness of the product can be compared to an image taken at the upper or lower surface of the product, or all three images can be compared, to determine the extent to which the amount of nanoparticles deposited varies. Computerized image analysis processing can be employed. For example, in FIG. 17, a section can be taken at line A-A and a section can be taken at B-B. A top view image of each section can be taken through electron microscope, scanning electron microscopy, and other microscopes. A top view image of the section taken at section A-A, for example, can be compared to a top view image taken at section B-B. The number of microfibers, the number of nanoparticles, or both, in samples of the same two-dimensional size can be assessed and compared. In addition, imaging techniques can be used on three dimensional samples. These techniques can be used to assess the orientation of fibers and other characteristics. These techniques can be used to determine that nanoparticles have been deposited into the depth of the substrate, have been deposited substantially across a significant portion of the substrate, substantially across the entire depth, or across some portion of the depth of the substrate.

Figure 18:
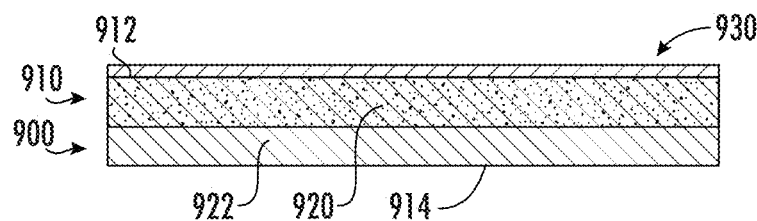
FIG. 18 illustrates a nonwoven material with nanoparticles dispersed through a depth of the material.

In other embodiments, the nanoparticles may be added into the substrate from both the first and second surfaces 816, 818. In these embodiments, the area density or "add-on amount" at first and second surfaces 816, 818 may be substantially equal to each other, or they may be different depending on the application. In these embodiments, the area density or "add-on amount" that is present in the middle of the substrate is lower than at surfaces 816, 818. For example, the area density in the middle of the substrate may be about 75% of the area density at surfaces 816, 818, or it may be about 50%, 40% or 25%. FIG. 18 illustrates a filter product 900 including a filter media 910 of nonwoven material including fibers 922 and nanoparticles 920 dispersed through at least a portion of filter media 910. As shown, filter media 910 has a first upper surface 912 and a second lower surface 914. The nanoparticles have been dispersed through upper surface 912 such that they extend beyond upper surface 912 and into the depth of filter media 910, as discussed above. Filter product 900 further includes a support layer 930, which may be any suitable support layer known in the art, such as a substantially rigid polymer that provides support for filter media 910, or an apertured film having a plurality of apertures for passage of gas or fluid therethrough (discussed above).

The fibers of a nonwoven substrate for forming a composite material as disclosed herein can be formed using known methods such as meltblown, spunbond, or other methods mentioned above. The fibers contemplated may have many shapes in cross-section, including without limitation, circular, kidney bean, dog bone, trilobal, barbell, bowtie, star, Y-shaped and others. These shapes and/or other conventional shapes may be used with the embodiments to obtain the desired performance characteristics. The fibers in the substrate stay connected to each other through thermal bonds, chemical bonds, by being entangled with one another, through the use of binding agents, such as adhesives, or the like.

The fibers of a nonwoven substrate may be artificial or natural fibers. Suitable materials for the fibers include, but are not limited to, polypropylene, polyesters (PET), PEN polyester, PCT polyester, polypropylene, PBT polyester, co-polyamides, polyethylene, high density polyethylene ("HDPE"), LLDPE, cross-linked polyethylene, polycarbonates, polyacrylates, polyacrylonitriles, polyfumaronitrile, polystyrenes, styrene maleic anhydride, polymethylpentene, cyclo-olefinic copolymer or fluorinated polymers, polytetrafluoroethylene, perfluorinated ethylene and hexfluoropropylene or a copolymer with PVDF like P(VDF-TrFE) or terpolymers like P(VDF-TrFE-CFE), propylene, polyimides, polyether ketones, cellulose ester, nylon and polyamides, polymethacrylic, poly(methyl methacrylate), polyoxymethylene, polysulfonates, acrylic, styrenated acrylics, pre-oxidized acrylic, fluorinated acrylic, vinyl acetate, vinyl acrylic, ethylene vinyl acetate, styrene-butadiene, ethylene/vinyl chloride, vinyl acetate copolymer, latex, polyester copolymer, carboxylated styrene acrylic or vinyl acetate, epoxy, acrylic multipolymer, phenolic, polyurethane, cellulose, styrene or any combination thereof. Other conventional fiber materials are contemplated.

The fibers of a nonwoven substrate may include fibers of different sizes, with the fibers generally having diameters ranging from about 1 to about 1000 microns with lengths ranging from about one half to three inches. The fibers may be configured as a gradient density media in which the pore size decreases from the upper surface of the filter (upstream) to the lower surface (downstream) to increase capture efficiency and dust holding capacity. This configuration also allows for the dispersion of different amounts of nanoparticles to the filter media at different depths. For example, the upstream side of the filter media may have the largest fiber size to allow for more void space and a greater density of nanoparticles, while the downstream side of the filter media has fibers with smaller sizes to provide a lower density of nanoparticles. Alternatively, this structure may be reversed to provide a greater density of nanoparticles in the downstream portion of the filter media.

The fibers of the nonwoven substrate as part of the composite material may stay connected to other fibers by being thermally-bonded, chemically-bonded or entangled with one another. Bicomponent fibers may be used, particularly with mechanical filtration, and these are formed by extruding two polymers from the same spinneret with both polymers contained within the same filament. Suitable materials for bicomponent fibers include, but are not limited to, polypropylene (PP)/polyethylene (PE), polyethylene terephthalate (PET)/polypropylene (PP) and the like.

Figures 24A, 24B, 24C:
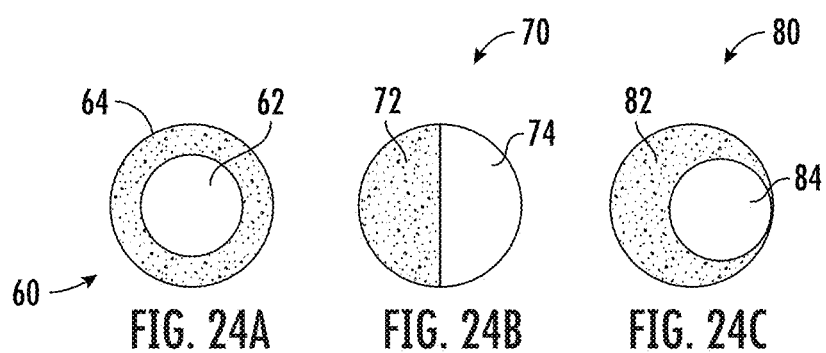
FIGS. 24A-24C illustrate biocomponent fibers incorporated into a nonwoven material.

In some embodiments, the substrate may comprise a "high loft" nonwoven material comprising spunbond or air through bonded carded nonwoven fibers. As used here in the term "high loft" means that the volume of void space is greater than volume of the total solid. In air through bonded carded nonwoven fibers, the loftiness of a substrate can be controlled by various means known to those of skill in the art. For example, loftiness can be increased by applying less compression force onto the media during bonding. In another example, a high loft nonwoven material can be manufactured with fibers having larger thicknesses, such as thicknesses greater than 3 denier, e.g., 5 denier or greater, 6 denier or greater (discussed in more detail below). In other embodiments, the loftiness may be increased by using eccentric biocomponent fibers, as shown in FIG. 24C and discussed in more detail below.

The fibers of the nonwoven substrate may have thicknesses that are suitable for the application. In some embodiments, the fibers have at least one dimension in the range of about 1 to about 10,000 micrometers or about 1 to about 1,000 micrometers or about 10 to 100 micrometers. The thickness of the fibers may also be measured in denier, which is a unit of measure in linear mass density of fibers. In some embodiments, the fibers may have a linear density of about 1 denier to about 10 denier. The nanoparticles are fibers having at least one dimension in the range of about 1 to about 1,000 nanometers or about 1 to about 100 nanometers. The dimensions described above fibers and nanoparticles may be a diameter or a width, depending on the shape of the fiber or nanoparticle.

For gas filters, such as pleated or unpleated air filters, the fibers may have a linear density in the range of about 1 denier to about 10 denier. The filter media may comprise fibers with the same or different linear densities.

Fibers in air filters typically have a linear density of about 3 denier or less to ensure that the fibers are small enough to capture contaminants passing through the filter. Applicant has surprisingly found that with the use of nanoparticles dispersed through the filter media, the fibers may have larger linear densities, e.g., greater than 3 denier. This is because the nanoparticles provide a significant filtering capability. In some cases, the fibers may have linear densities of greater than 3 denier, 5 denier or greater, 6 denier or greater or as large as 7-10 denier.

Applicant has also found that, in some applications, fibers with larger linear densities than used in conventional filters (e.g., greater than about 3 denier) provide more open space or pores within the filter media, which allows for a greater density of nanoparticles to be dispersed therein. While this may be counterintuitive to those of skill in the art, Applicant has discovered that fibers with larger linear densities that incorporate nanoparticles actually improves the overall efficiency of the filter.

In certain embodiments, a filter media may include at least two different fiber thicknesses or linear densities to provide at least two different layers of filter within the same filter media. For example, in some cases, one portion of the filter media will include fibers with linear densities greater than 3 denier, for example, 5 denier or greater or 6 denier or greater. The other portion of the filter media will comprise fibers with more standard linear densities of 3 denier or less. This dual-layer filter media creates a first filter portion that filters contaminants primarily with nanoparticles that have a high density within the larger thickness fibers and a second filter portion that filters contaminants primarily with the fibers having lower linear densities, although both portions may include nanoparticles dispersed throughout the fibers. In certain embodiments, the filter media may include three or more separate portions or layers with different denier fiber ranges within each portion.

Figure 19:
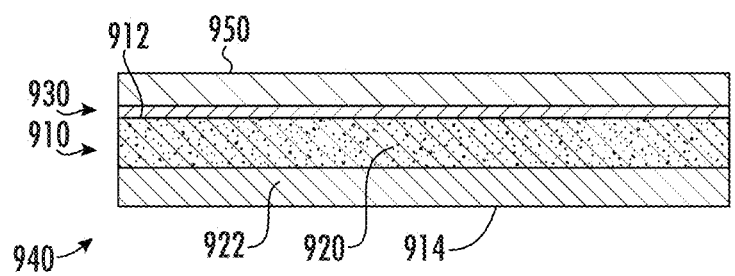
FIG. 19 illustrates a nonwoven material with nanoparticles dispersed through a depth of the material and a scrim layer overlying the nanoparticles.

FIG. 19 illustrates another filter product 940 that includes a filter media 910 of nonwoven material including fibers 922 and nanoparticles 920 dispersed through a portion of filter media 910. In this embodiment, product 940 includes a scrim layer 950 bonded to a support layer 930.

Figure 20:
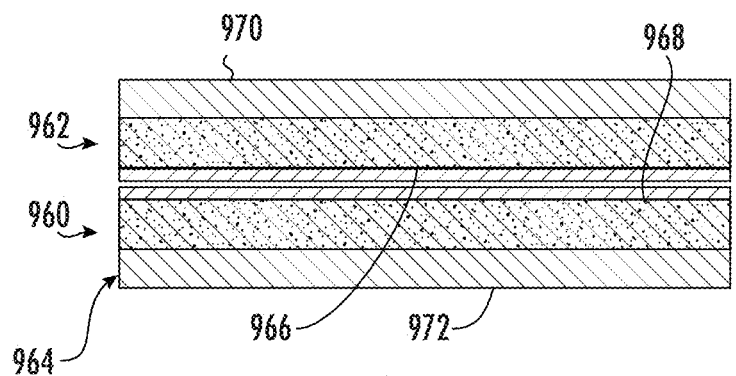
FIG. 20 illustrates a dual-layer nonwoven material with nanoparticles dispersed onto inner surfaces of the two layers.

FIG. 20 illustrates a dual-layer filter product 960 that includes first and second filter medias 962, 964 bonded to each other. As shown, nanoparticles 920 have been dispersed throughout a depth of each filter media 962, 964. In this embodiment, nanoparticles 920 have been dispersed through inner surfaces 966, 968 of filter media 962, 964. In another embodiment (not shown), the nanoparticles are dispersed through outer surfaces 970, 972 of filter media 962, 964. In yet another embodiment, nanoparticles 920 may be deposited on inner surface 966 of media 962 and outer surface 972 of media 964. Filter products similar to those in FIGS. 19 and 20 can incorporate a composite material having an apertured polymeric sheet, or any other substrate material mentioned herein. Filter products having combinations of composite materials with different substrates can be used.

Figure 21:
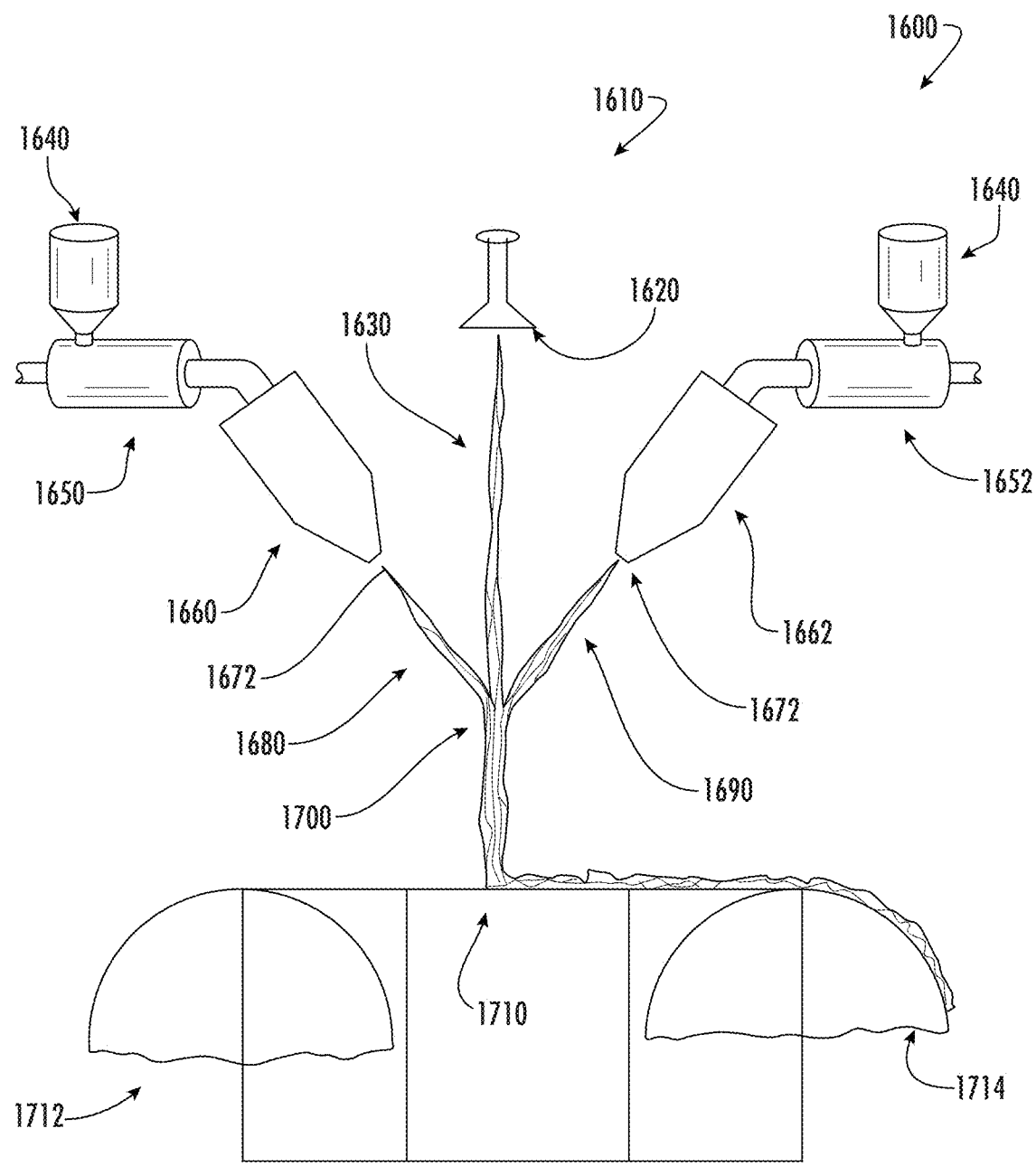
FIG. 21 illustrates an alternative embodiment of a system for manufacturing nonwoven material in fluid streams.

FIG. 21 illustrates an apparatus for incorporating nanoparticles into one or more fiber streams during, for example, a fiber spinning process. In one such embodiment, nanoparticles are dispersed between two meltblowing dies wherein melted polymers are pushed through small holes to make fibers. When the nanoparticles meet with the fibers while they are still tacky, they are mechanically entangled with the fibers and thermally bonded to the fibers. Thus, in some embodiments, there is no need for an additional bonding process.

As shown in FIG. 21, an apparatus 1600 for forming a fibrous nonwoven structure comprises a fiberization system 1610 similar to one of the systems and devices described above. Fiberization system 1610 includes a nozzle 1620 or similar device for dispersing the individual nanoparticles into a first stream 1630. Apparatus 1600 further includes a system for generating one or more streams of fibers that will be combined with the stream 1630 of individual nanoparticles. This system may comprise any known system in the art, such as spunbond, carded, extrusion and the like.

In one example, the system may comprise a spunbond line, wherein filaments are formed by spinning molten polymer and stretching the molten filaments. Fiber bundles of filaments are separated and spread, and then and layered on a net to form a web. The fibers are bound in the form of a sheet through thermal bonding and embossing. First stream 630 may, for example, be introduced before the attenuation zone or before the bonding (consolidation) process.

In another embodiment, the system may comprise two carding machines disposed in-series with each other. First stream 1630 may be introduced at any point after the first carding line and before the second carding line such that nanoparticles are sandwiched between two carding fiber webs. After that, all of the fibers including nanoparticles are bonded (nanoparticles are thermally interlocked) together in an air through bonding oven.

In another embodiment, apparatus comprises first and second feeders, such as hoppers 1640, 1642, coupled to first and second extruders 1650, 1652. Each extruder may, for example, comprise an extrusion screw (not shown) which is driven by a conventional drive motor (not shown). As the polymer advances through the extruders 1650, 1652, due to rotation of the extrusion screw by the drive motor, it is progressively heated to a molten state. Heating the thermoplastic polymer to the molten state may be accomplished in a plurality of discrete steps with its temperature being gradually elevated as it advances through discrete heating zones of the extruders 1650, 1652 toward two meltblowing dies 1660, 1662, respectively. The meltblowing dies 1660, 1662 may be yet another heating zone where the temperature of the thermoplastic resin is maintained at an elevated level for extrusion.

Each meltblowing die 1660, 1662 is configured so that two streams of attenuating gas per die converge to form a single stream of gas which entrains and attenuates molten threads, as the threads exit small holes or orifices 1672 in the meltblowing die. The molten threads are attenuated into fibers or, depending upon the degree of attenuation, microfibers, of a small diameter which is usually less than the diameter of the orifices 1672. Thus, each meltblowing die 1660, 1662 has a corresponding single primary air stream 1680, 1690 of gas containing entrained and attenuated polymer fibers.

The primary air streams 1680, 1690 containing polymer fibers are aligned to converge at a formation zone 1700. In addition, the first stream 630 of individual nanoparticles is added to the two primary air streams 1680, 1690 of thermoplastic polymer fibers or microfibers at the formation zone 1030. Introduction of the individual nanoparticles into the two primary air streams 1680, 1690 of fibers is designed to produce a distribution of secondary fibrous materials 1032 within the combined primary air streams 1680, 1690 of fibers. This may be accomplished by merging the first stream 1630 of individual nanofibers between the two primary air streams 1680, 1690 so that all three gas streams converge in a controlled manner.

Examples of suitable meltblowing dies that may be utilized for manufacturing nonwoven materials are discussed in more detail in U.S. Pat. Nos. 6,972,104, 8,017,534 and 7,772,456 and US Patent Application No. US20200216979A1, the complete disclosures of which are incorporated herein by reference in their entirety for all purposes.

FIGS. 24A-24C illustrate different examples of biocomponent fibers that may be used with the nonwoven substrate materials disclosed herein. FIG. 24A illustrates a fiber 60 having a core fiber 62 and a surrounding sheath fiber 64. In this embodiment, the core 62 is substantially co-centric with the sheath. FIG. 24B illustrates a biocomponent fiber 70 having first and second fibers 72, 74 that are disposed side-by-side with each other. FIG. 24C illustrates a biocomponent fiber 80 having a core fiber 82 and a sheath fiber 84. In this embodiment, core 82 is eccentric relative to the longitudinal axis of sheath 84, which increases the overall loftiness of the biocomponent fiber. Of course, other configurations are possible. For example, the core may comprise shapes other than circular, such as dog-bone shaped, square, triangular, diamond or the like. Alternatively, the fiber may comprise multiple cores, or it may be split into three, four or more quadrants.

Embodiment 1 is a polymeric sheet comprising at least one polymer layer having one or more apertures for flow of gas or liquid therethrough; and a plurality of nanoparticles disposed within the polymer layer, wherein the nanoparticles have at least one dimension less than 1 micron. Embodiment 2 is the sheet of embodiment 1, wherein the polymer layer has a first surface and a second surface opposite the first surface, wherein at least a portion of the nanoparticles are disposed between the first surface and the second surface. Embodiment 3 is the sheet of any one of embodiments 1 or 2, wherein the polymer layer comprises at least one crease to form a pleat within the sheet.

Embodiment 4 is the sheet of any one of embodiments 1 to 3, wherein the polymer layer is an extruded film. Embodiment 5 is the sheet of any one of embodiments 1 to 4, wherein the apertures comprise pores or perforations. Embodiment 6 is the sheet of any one of embodiments 1 to 5, wherein the apertures are hexagonal, square or diamond shaped.

Embodiment 7 is the sheet of any one of embodiments 1 to 6, further including a plurality of pleats extending across a surface of the polymer layer. Embodiment 8 is the sheet of any one of embodiments 1 to 7, wherein the polymer layer is selected from a group consisting of a polypropylene film, a high density polyethylene film, and a polylactic acid film. In any of the embodiments disclosed herein, a polymeric sheet comprises at least one polymer layer having one or more apertures for flow of gas or liquid therethrough; and a plurality of nanoparticles disposed within the polymer layer, wherein the nanoparticles have at least one dimension less than 1 micron; further wherein the apertures comprise pores or perforations; and further wherein the polymer layer is selected from a group consisting of a polypropylene film, a high density polyethylene film, and a polylactic acid film.

Embodiment 9 is the sheet of any one of embodiments 1 to 8, further including a mesh, netting, fabric, knit or weave. Embodiment 10 is the sheet of any one of embodiments 1 to 9, wherein the polymer layer is a substantially rigid support layer for a gas filter.

Embodiment 11 is the sheet of any one of embodiments 1 to 10, wherein the polymer layer is a flexible surface layer for a face mask. Embodiment 12 is the sheet of any one of embodiments 1 to 11, wherein the polymer layer is a flexible surface layer for a finger bandage pad.

Embodiment 13 is the sheet of any one of embodiments 1 to 12, wherein the polymer layer is co-extruded to form an adhesive bonding layer.

Embodiment 14 is the sheet of any one of embodiments 1 to 13 wherein the nanoparticles form a gradient within the polymer layer such that a density of the nanoparticles decreases from the first surface to the second surface. Embodiment 15 is the sheet of any one of embodiments 1 to14, wherein the nanoparticles are substantially uniformly dispersed throughout the polymer layer.

Embodiment 16 is the sheet of any one of embodiments 1 to 15, wherein the nanoparticles are isolated within a fluid and dispersed through a first surface of the polymer layer.

Embodiment 17 is the sheet of any one of embodiments 1 to 16, wherein the polymer layer comprises fibers having an electrostatic charge. In any of the embodiments disclosed herein, a polymeric sheet comprises at least one polymer layer having one or more apertures for flow of gas or liquid therethrough; and a plurality of nanoparticles disposed within the polymer layer, wherein the nanoparticles have at least one dimension less than 1 micron; further wherein the apertures comprise pores or perforations; and further wherein the polymer layer, the nanoparticles, or both have an electrostatic charge.

Embodiment 18 is the sheet of any one of embodiments 1 to 17, wherein the nanoparticles are selected from a group consisting of carbon fibers, glass fibers, polypropylene fibers, nylon fibers, polylactide fibers, and combinations thereof.

Embodiment 19 is the sheet of any one of embodiments 1 to 18, further comprising a binding agent within the polymer layer bonding the nanoparticles to the polymer layer. Embodiment 20 is the sheet of any one of embodiments 1 to 19, further comprising a binding agent, wherein the binding agent comprises a material selected from the group consisting of starch, dextrin, guar gum, PVOH and synthetic resins.

Embodiment 21 is a gas filter comprising a filter media; and a substantially rigid support layer bonded to the filter media, wherein the support layer includes fibers and a plurality of nanoparticles disposed within the support layer, wherein the nanoparticles have at least one dimension less than 1 micron. Embodiment 22 is the gas filter of embodiment 21, wherein the nanoparticles are configured to filter contaminants passing through the support layer.

Embodiment 23 is the gas filter of any one of embodiments 21 to 22, wherein the support layer comprises at least one extruded polymer film having one or more apertures for flow of gas or liquid therethrough. Embodiment 24 is the gas filter of any one of embodiments 21 to 23, wherein the polymer film has a first surface and a second surface opposite the first surface, wherein at least a portion of the nanoparticles are disposed between the first and second surfaces.

Embodiment 25 is the gas filter of any one of embodiments 21 to 24, wherein the polymer film comprises at least one crease to form a pleat within the sheet.

Embodiment 26 is the gas filter of any one of embodiments 23 to 25, wherein the apertures comprise pores or perforations. Embodiment 27 is the gas filter of any one of embodiments 23 to 26, wherein the apertures are hexagonal, square or diamond shaped.

Embodiment 28 is the gas filter of any one of embodiments 21 to 27, further including a plurality of pleats extending across a surface of the filter media.

Embodiment 29 is the gas filter of any one of embodiments 23 to 28, wherein the polymer film is selected from the group consisting of a polypropylene film, a high density polyethylene film, and a polylactic acid film.

Embodiment 30 is the gas filter of any one of embodiments 21 to 29, further including a mesh, netting, fabric, knit or weave.

Embodiment 31 is the gas filter of any one of embodiments 21 to 30, wherein the nanoparticles are isolated within a fluid and dispersed through a first surface of the filter media.

Embodiment 32 is the gas filter of any one of embodiments 21 to 31, wherein the support layer comprises fibers having an electrostatic charge. In any of the embodiments disclosed herein, the support layer, the nanoparticles, or both have an electrostatic charge.

Embodiment 33 is the gas filter of any one of embodiments 21 to 32, wherein the nanoparticles are selected from a group consisting of carbon fibers, glass fibers, polypropylene fibers, nylon fibers, polylactide fibers, and combinations thereof.

Embodiment 34 is the gas filter of any one of embodiments 21 to 33, further comprising a binding agent bonding the nanoparticles to the support layer. Embodiment 35 is the gas filter of any one of embodiments 21 to 34, further comprising a binding agent, wherein the binding agent comprises a material selected from the group consisting of starch, dextrin, guar gum, PVOH and synthetic resins.

Embodiment 36 is a composite material, comprising a substrate having pores within an internal structure; a plurality of nanoparticles within the internal structure of the substrate, the nanoparticles having at least one dimension less than 1 micrometer; and wherein the nanoparticles form a gradient within the substrate such that a density of the nanoparticles decreases from a first surface to an opposing second surface of the substrate. Embodiment 37 is the composite material of embodiment 36, wherein the substrate comprises a fibrous material.

Embodiment 38 is the composite material of embodiment 37, wherein the fibrous material comprises a plurality of microfibers, the microfibers having a dimension of 1 micrometer or more.

Embodiment 39 is the composite material of any one of embodiments 36 to 38, wherein the microfibers are formed in a process selected from a group consisting of spunbond process, a melt blown process, and electrospinning process.

Embodiment 40 is the composite material of any one of embodiments 36 to 39, wherein the nanoparticles extend below the outer surface by a distance of between about 1 millimeter and about 3 millimeters.

Embodiment 41 is a gas filter having the composite material of any one of embodiments 36 to 40.

Embodiment 42 is a liquid filter having the composite material of any one of embodiments 36 to 41.

Embodiment 43 is a face mask having the composite material of any one of embodiments 36. To 42

Example 1

A microfiber substrate of bicomponent fibers having an inner circular section of polyester, and an outer concentric section of HDPE was provided in a roll. In a roll to roll process, the substrate was sprayed with adhesive, and nanofibers of biosoluble glass fiber or nanoparticles were deposited. The nonwoven product was then heated in an oven, and the cooled nonwoven product was gathered onto another roll.

Nanoparticles are deposited according to processes described in FIGS. 12-16 below. In experiments, bio soluble glass nanofibers are used. Nanofiber diameter is about 700 nm while the length is about 500 microns. Carded air through bonded nonwovens made of bicomponent fibers are used as substrate in the following examples:

Flat sheet filter media samples tested at 110 fpm filtration velocity. Sample size was 12"×12". NaCl salt particles in the range of 0.3 to 10 micron were used as contaminants.

Example 2

A carded nonwoven made of 3 denier PET/PE bicomponent fiber is used as substrate. A composition compromising water, 2-hexoxyethanol, isopropanolamine, sodium dodecylbenzene sulfonate, lauramine oxide, ammonium hydroxide is used as binder. Different nanofiber add-on amounts are controlled via adjusting line speed.

TABLE 1

| Sample | gsm | Nanoparticle add-on gsm | Pressure drop "H20 | E1 | E2 | E3 | MERV Rating |
|---|---|---|---|---|---|---|---|
| Substrate | 54.9 | | 0.07 | 0 | 17 | 58 | 7 |
| A1 | 55.7 | 0.82 | 0.14 | 23 | 62 | 94 | 10 |
| A2 | 56.5 | 1.64 | 0.17 | 32 | 73 | 97 | 11 |
| A3 | 57.4 | 2.46 | 0.24 | 47 | 86 | 98 | 12 |

This example illustrates that by controlling the add-on amount of nanoparticles, MERV ratings are increasing from MERV 7 to up to MERV13.

Example 3

A high loft air through carded nonwoven with 5 denier bicomponent fiber is used as a substrate. A typical starch binder is diluted and sprayed before nanofiber deposition. Starch bonded nanofibers adequately as solvent evaporates and drying occurs under IR heater.

TABLE 2

| Sample | Pressure drop "H20 | E1 | E2 | E3 | MERV Rating |
|---|---|---|---|---|---|
| B1 | 0.1 | 24% | 58% | 88% | 10 |
| B2 | 0.17 | 34% | 71% | 90% | 11 |
| B3 | 0.26 | 47% | 85% | 98% | 12 |
| B4 | 0.29 | 59% | 91% | 99% | 13 |
| B5 | 0.5 | 76% | 97% | 100% | 14 |

Example 4

Spunbond or meltblown media were used as a substate with the nanoparticles being incorporated into the substrate as described herein after IPA discharge. The spunbond fibers were made from a melted polymer that was spun and drawn to produce filaments. The average basis weight of the substrates was about 90 gsm and the average thickness was about 0.57 mm. A base sample was used that did not incorporate any nanoparticles. 4 separate samples were prepared that included nanoparticles incorporated into the substrate as described herein. In sample 2, the nanoparticles were incorporated into meltblown fibers after IPA discharge. In samples 1, 3 and 4 the nanoparticles were incorporated into spunbond fibers after IPA discharge. The results of this testing are shown in Table 3 below.

TABLE 3

| Sample # | Substrate | PD | E1 | E2 | E3 | MERV |
|---|---|---|---|---|---|---|
| 1 | CAB81 (spunbond) | 0.41 | 96% | 100% | 100% | 16 |
| 2 | CAB81 (meltblown) | 0.24 | 75% | 98% | 100% | 14 |
| 3 | CAB81 (spunbond) | 0.40 | 92% | 100% | 100% | 15 |
| 4 | CAB81 (spunbond) | 0.17 | 48% | 87% | 99% | 12 |
| Base | CAB81 (spunbond) | 0.07 | 9% | 46% | 90% | 9 |

As shown, the efficiency of the filter media samples incorporating nanoparticles increased over the base sample in all three particle groups with significant increases in the E2 and E3 particles groups. The overall MERV ratings of the samples increased from MERV 7 (base sample) to MERV 12 to MERV 16 with nanoparticles. The base sample without nanoparticles had a pressure drop of 0.07 inches of water. Samples 1-4 had a slightly increased pressure drop ranging from 0.17 to 0.41 inches of water. In Sample 2, wherein the nanoparticles were incorporated into meltblown fibers, the MERV rating was 14 and the pressure drop was 0.24 inches of water.

Example 5

5 Denier air through carded fibers were used as a substate. A base sample was used that did not incorporate nanoparticles. 2 separate samples were prepared that included nanoparticles incorporated into the substrate as described herein. The results of this testing are shown in Table 4 below.

TABLE 4

| Sample # | Substrate | PD | E1 | E2 | E3 | MERV |
|---|---|---|---|---|---|---|
| Base | 5D Fiber Carded | 0.03 | −1% | 2% | 38% | 6 |
| 1 | 5D Fiber Carded | 0.31 | 57% | 90% | 98% | 13 |
| 2 | 5D Fiber Carded | 0.33 | 61% | 92% | 98% | 13 |

As shown, the efficiency of the filter media samples incorporating nanoparticles increased substantially over the base sample in all three particle groups. The overall MERV ratings of the samples increased from MERV 6 (base sample) to MERV 13 with nanoparticles. The base sample without nanoparticles had a pressure drop of 0.03 inches of water. Samples 1 and had a slightly increased pressure drop ranging from 0.31 to 0.33 inches of water.

Example 6

Meltblown fibers were used as a substate. The substrates had an average basis weight of about 24 gsm and an average thickness of about 0.4 mm. A base sample was used that did not incorporate nanoparticles or an adhesive such as PVOH. Sample 1 included meltblown fibers with the belt up. PVOH was sprayed onto the fibers, but nanoparticles were not incorporated therein. sample 2 included meltblown fibers fuzzy side up. PVOH was sprayed onto the fibers, but nanoparticles were not incorporated therein. Sample 3 included meltblown fibers with PVOH sprayed thereon and nanoparticles incorporated into the fibers as described herein. The results of this testing are shown in Table 5 below.

TABLE 5

| Sample # | Substrate | PD | E1 | E2 | E3 | MERV |
|---|---|---|---|---|---|---|
| Base | Meltblown | 0.35 | 82% | 96% | 99% | 14 |
| 1 | Meltblown | 0.38 | 68% | 88% | 93% | 13 |
| 2 | Meltblown | 0.41 | 78% | 95% | 97% | 14 |
| 3 | Meltblown | 1.02 | 92% | 99% | 99% | 15 |

As shown, the efficiency of the sample 3 that incorporated nanoparticles increased over the other three base samples in all three particle groups, particularly in the E1 particle group. The overall MERV rating of sample 3 increased from MERV 13 or 14 (base samples) to MERV 15 with nanoparticles. The PVOH added to samples 2 and 3 did not substantially increase the pressure drop (i.e., 0.35 in the base sample and 0.38 and 0.41 in samples 1 and 2. The pressure drop of sample 3 did increase from a about 0.40 inches of water to about 1 inches of water. In Sample 3, wherein the nanoparticles where incorporated into the meltblown fibers, the MERV rating was 15 and the pressure drop was 1.02 inches of water.

Example 7

5 Denier air through carded fibers were used as a substate. A base sample was used that did not incorporate nanoparticles. Seven additional samples were prepared that included 5 Denier carded fibers with nanoparticles incorporated into the substrate as described herein. The results of this testing are shown in Table 6 below.

TABLE 6

| Sample # | Substrate | PD | E1 | E2 | E3 | MERV |
|---|---|---|---|---|---|---|
| Base | 5D Fiber Carded | 0.03 | −1% | 2% | 38% | 6 |
| 1 | 5D Fiber Carded | 0.07 | 7% | 31% | 69% | 7 |
| 2 | 5D Fiber Carded | 0.09 | 5% | 36% | 69% | 7 |
| 3 | 5D Fiber Carded | 0.15 | 16% | 51% | 77% | 9 |
| 4 | 5D Fiber Carded | 0.16 | 21% | 58% | 81% | 10 |
| 5 | 5D Fiber Carded | 0.17 | 31% | 70% | 90% | 11 |
| 6 | 5D Fiber Carded | 0.28 | 46% | 85% | 96% | 12 |
| 7 | 5D Fiber Carded | 0.32 | 58% | 91% | 97% | 13 |

As shown, the efficiency of the seven samples that incorporated nanoparticles increased over the base sample in all three particle groups, particularly in the E2 and E3 particle groups. The overall MERV ratings were increased from MERV 6 (base sample) to MERV 7 through MERV 13 with nanoparticles. The pressure drop only increased from 0.03 inches of water to a maximum of 0.32 in H20.

Example 8

High loft spunbond fibers were used as a substate in a continuous fiber line. This trial included two different versions: 205-6 and 205-2 in which the settings were changed on the continuous fiber line to produce two substrates with different weight and thicknesses. A base sample for each version (205-6 and 205-2) was used that did not incorporate nanoparticles. Six additional samples were prepared that included 205-6 and 205-2 fibers with nanoparticles incorporated into the substrate as described herein. The results of this testing are shown in Table 7 below.

TABLE 7

| Sample # | Substrate | PD | E1 | E2 | E3 | MERV |
|---|---|---|---|---|---|---|
| Base | 205-6 | 0.04 | 0% | 9% | 43% | 6 |
| Base | 205-2 | 0.04 | 0% | 8% | 37% | 6 |
| 1 | 205-6 | 0.86 | 88% | 98% | 99% | 15 |
| 2 | 205-2 | 0.48 | 79% | 96% | 99% | 14 |
| 3 | 205-6 | 0.87 | 82% | 97% | 99% | 14 |
| 4 | 205-2 | 0.42 | 61% | 90% | 98% | 13 |
| 5 | 205-6 | 0.78 | 79% | 97% | 99% | 14 |
| 6 | 205-2 | 0.23 | 44% | 79% | 96% | 11 |

As shown, the efficiency of the six samples that incorporated nanoparticles demonstrated substantially increased efficiency over the base sample in all three particle groups. The overall MERV ratings were increased from MERV 6 (base sample) to MERV 11 through MERV 14 with nanoparticles. The pressure drop only increased from 0.04 inches of water to a maximum of 0.87 inches of water. The pressure drops in the 205-2 samples only increased to a maximum of 0.48 in H2O.

Example 9

Spunbond and meltblown fibers were used as a substate. The average basis weight for the substrates was about 70 gsm for the spunbond fibers and about 24 gsm for the meltblown fibers The average thickness of the substrates was about 0.75 mm. A base sample was used that did not incorporate nanoparticles. Five additional samples were prepared that included spunbond plus meltblown fibers with nanoparticles into the fibers as described herein In samples 1-3, the nanoparticles were sprayed onto the meltblown fibers. In samples 4 and 5, the nanoparticles were sprayed onto the spunbond fibers. Also, in samples 1 and 2, the adhesive PVOH was not sprayed onto the substrate. PVOH was sprayed onto samples 3-5. The results of this testing are shown in Table 8 below.

TABLE 8

| Sample # | Substrate | PD | E1 | E2 | E3 | MERV |
| --- | --- | --- | --- | --- | --- | --- |
| Base | Spunbond + MB | 0.07 | 2% | 17% | 29% | 5 |
| 1 | Spunbond + MB | 0.41 | 100% | 100% | 100% | 16 |
| 2 | Spunbond + MB | 0.56 | 100% | 100% | 100% | 16 |
| 3 | Spunbond + MB | 0.26 | 99% | 100% | 100% | 16 |
| 4 | Spunbond + MB | 0.4 | 100% | 100% | 100% | 16 |
| 5 | Spunbond + MB | 0.17 | 97% | 100% | 100% | 16 |

As shown, the efficiency of the five samples that incorporated nanoparticles demonstrated substantially increased efficiency over the base sample in all three particle groups. The overall MERV ratings were increased from MERV 5 (base sample) to MERV 16 with nanoparticles. The pressure drop only increased from 0.07 inches of water to a maximum of 0.56 inches of water. In samples 3-5 (PVOH sprayed onto the substrate), the pressure drop only increased to a maximum of 0.4 inches of water.

Example 10

5 Denier air through carded glass fibers were used as a substate. A Base sample was used that did not incorporate nanoparticles. Three additional samples were prepared that included 5 Denier carded glass fibers with nanoparticles incorporated therein. The results of this testing are shown in Table 9 below.

TABLE 9

| Sample # | Substrate | PD | E1 | E2 | E3 | MERV |
| --- | --- | --- | --- | --- | --- | --- |
| Base | 5D fiber carded | 0.03 | −1% | 2% | 38% | 6 |
| 1 | 5D fiber carded | 0.27 | 59% | 91% | 99% | 13 |
| 2 | 5D fiber carded | 0.18 | 45% | 83% | 98% | 12 |
| 3 | 5D fiber carded | 0.24 | 54% | 89% | 99% | 13 |

As shown, the efficiency of the three samples that incorporated nanoparticles demonstrated substantially increased efficiency over the base sample in all three particle groups. The overall MERV ratings were increased from MERV 6 (base sample) to MERV 12 or MERV 13 with nanoparticles. The pressure drop only increased from 0.03 inches of water to a maximum of 0.27 inches of water.

Example 11

A fiber blend of 5 Denier and 7 Denier air through carded glass fibers were used as a substate. The media was air through bonded. A Base sample was used that did not incorporate nanoparticles. Nineteen additional samples were prepared that included a fiber blend of 5 Denier and 7 Denier carded glass fibers with nanoparticles incorporated therein. The results of this testing are shown in Table 10 below.

TABLE 10

| Sample # | Substrate | PD | E1 | E2 | E3 | MERV |
| --- | --- | --- | --- | --- | --- | --- |
| Base | 5D/7D carded | 0.03 | −1% | 2% | 38% | 6 |
| 1 | 5D/7D carded | 0.15 | 37% | 64% | 95% | 10 |
| 2 | 5D/7D carded | 0.21 | 33% | 70% | 92% | 11 |
| 3 | 5D/7D carded | 0.17 | 42% | 80% | 98% | 11 |
| 4 | 5D/7D carded | 0.25 | 47% | 82% | 96% | 12 |
| 5 | 5D/7D carded | 0.20 | 48% | 84% | 98% | 12 |
| 6 | 5D/7D carded | 0.22 | 49% | 84% | 98% | 12 |
| 7 | 5D/7D carded | 0.23 | 53% | 85% | 97% | 13 |
| 8 | 5D/7D carded | 0.23 | 53% | 87% | 98% | 13 |
| 9 | 5D/7D carded | 0.23 | 54% | 88% | 98% | 13 |
| 10 | 5D/7D carded | 0.27 | 54% | 88% | 98% | 13 |
| 11 | 5D/7D carded | 0.28 | 54% | 87% | 98% | 13 |
| 12 | 5D/7D carded | 0.24 | 56% | 89% | 98% | 13 |
| 13 | 5D/7D carded | 0.26 | 56% | 88% | 98% | 13 |
| 14 | 5D/7D carded | 0.25 | 57% | 90% | 98% | 13 |
| 15 | 5D/7D carded | 0.27 | 57% | 89% | 98% | 13 |
| 16 | 5D/7D carded | 0.28 | 57% | 89% | 98% | 13 |
| 17 | 5D/7D carded | 0.28 | 58% | 90% | 98% | 13 |
| 18 | 5D/7D carded | 0.30 | 58% | 90% | 98% | 13 |
| 19 | 5D/7D carded | 0.29 | 59% | 89% | 98% | 13 |
| 20 | 5D/7D carded | 0.31 | 65% | 94% | 99% | 13 |

As shown, the efficiency of all 19 samples that incorporated nanoparticles demonstrated substantially increased efficiency over the base sample in all three particle groups. The overall MERV ratings were increased from MERV 6 (base sample) to MERV 10 through MERV 13 with nanoparticles (the majority of the samples were rated at MERV 13). The pressure drop only increased from 0.03 inches of water to a maximum of 0.31 inches of water.

While the devices, systems and methods have been described in detail herein in accordance with certain preferred embodiments thereof, many modifications and changes therein may be effected by those skilled in the art. Accordingly, the foregoing description should not be construed to be limited thereby but should be construed to include such aforementioned obvious variations and be limited only by the spirit and scope of the following claims.

What is claimed is:
1. A polymeric sheet comprising:
  at least one polymer layer having one or more apertures for flow of gas or liquid therethrough, wherein the apertures are hexagonal, square or diamond shaped; and
  a plurality of nanoparticles disposed within the polymer layer, wherein the nanoparticles have at least one dimension less than 1 micron.
2. The sheet of claim 1, wherein the polymer layer has a first surface and a second surface opposite the first surface, wherein at least a portion of the nanoparticles are disposed between the first surface and the second surface.

3. The sheet of claim 1, wherein the polymer layer is an extruded film.

4. The sheet of claim 1, wherein the apertures comprise pores or perforations.

5. The sheet of claim 1, wherein the polymer layer is selected from a group consisting of a polypropylene film, a high density polyethylene film, and a polylactic acid film.

6. The sheet of claim 1, further including a mesh, netting, fabric, knit or weave.

7. The sheet of claim 1, wherein the polymer layer is a substantially rigid support layer for a gas filter.

8. The sheet of claim 1, wherein the polymer layer is co-extruded to form an adhesive bonding layer.

9. The sheet of claim 1, wherein the nanoparticles are substantially uniformly dispersed throughout the polymer layer.

10. The sheet of claim 1, wherein the polymer layer comprises fibers having an electrostatic charge.

11. A gas filter comprising:
a filter media; and
a substantially rigid support layer bonded to the filter media, wherein the support layer includes fibers and a plurality of nanoparticles disposed within the support layer, wherein the nanoparticles have at least one dimension less than 1 micron, wherein the support layer comprises at least one extruded polymer film having one or more apertures for flow of gas or liquid therethrough.

12. The gas filter of claim 11, wherein the nanoparticles are configured to filter contaminants passing through the support layer.

13. The gas filter of claim 11, wherein the polymer film has a first surface and a second surface opposite the first surface, wherein at least a portion of the nanoparticles are disposed between the first and second surfaces.

14. The gas filter of claim 11, wherein the apertures comprise pores or perforations.

15. The gas filter of claim 11, wherein the apertures are hexagonal, square, oblong, circular, triangular, rectangular or diamond shaped.

16. A composite material, comprising:
a substrate having pores within an internal structure, wherein the pores are hexagonal, square or diamond shaped;
a plurality of nanoparticles within the internal structure of the substrate, the nanoparticles having at least one dimension less than 1 micrometer; and
wherein the nanoparticles form a gradient within the substrate such that a density of the nanoparticles decreases from a first surface to an opposing second surface of the substrate.

17. The composite material of claim 16, wherein the nanoparticles extend below an outer surface of the substrate by a distance of between about 1 millimeter and about 3 millimeters.

* * * * *